United States Patent [19]

Scalzi et al.

[11] Patent Number: 5,895,494
[45] Date of Patent: Apr. 20, 1999

[54] METHOD OF EXECUTING PERFORM LOCKED OPERATION INSTRUCTIONS FOR SUPPORTING RECOVERY OF DATA CONSISTENCY IF LOST DUE TO PROCESSOR FAILURE, AND A METHOD OF RECOVERING THE DATA CONSISTENCY AFTER PROCESSOR FAILURE

[75] Inventors: Casper Anthony Scalzi; Kenneth Ernest Plambeck, both of Poughkeepsie, N.Y.

[73] Assignee: International Business Machines Corporation, Armonk, N.Y.

[21] Appl. No.: 08/924,890

[22] Filed: Sep. 5, 1997

[51] Int. Cl.$^6$ ............................................ G06F 12/00
[52] U.S. Cl. ................................. 711/150; 395/392
[58] Field of Search ................................. 711/144, 149, 711/150, 152; 395/376, 392

[56] References Cited

U.S. PATENT DOCUMENTS

| | | | |
|---|---|---|---|
| 4,851,990 | 7/1989 | Johnson et al. | 395/280 |
| 5,081,572 | 1/1992 | Arnold | 711/163 |
| 5,142,676 | 8/1992 | Fried et al. | 711/152 |
| 5,333,297 | 7/1994 | Lemaire et al. | 395/500 |
| 5,410,697 | 4/1995 | Baird et al. | 711/152 |
| 5,488,729 | 1/1996 | Vegesna et al. | 395/385 |
| 5,574,922 | 11/1996 | James | 395/561 |
| 5,590,326 | 12/1996 | Manabe | 711/150 |
| 5,623,671 | 4/1997 | Ando et al. | 395/726 |
| 5,636,361 | 6/1997 | Ingerman | 711/150 |
| 5,659,711 | 8/1997 | Sugita | 711/144 |
| 5,669,002 | 9/1997 | Buch | 395/726 |
| 5,696,939 | 12/1997 | Iacobovici et al. | |

OTHER PUBLICATIONS

U.S. application No. 08/864,585, Greenspan et al., PO997053, filed May 28, 1997.
U.S. application No. 08/864,402, Greenspan et al., PO996083, filed May 28, 1997.

*Primary Examiner*—Krisna Lim
*Attorney, Agent, or Firm*—Marc A. Ehrlich; Bernard M. Goldman

[57] ABSTRACT

Provides a processor method of executing instances of a Perform Locked Operation (PLO) instruction for enabling a recovery of the consistency of a resource unit being changed by a PLO instance when processor failure occurs anywhere during execution of the PLO instance. The method uses a PLO save area for each processor in a computer system capable of executing PLO instructions. Each PLO save area has a resource-inconsistency (RI) indicator having an RI state and a non-RI state, and stores the function code (FC) of the PLO instance. The RI state indicates that the resource is in a non-usable potentially inconsistent state, and the non-RI state indicates the resource is in the consistent state and may be used. A processor executing a PLO instance writes into its PLO save area all resource addresses where a change is to be made in the resource unit, and also writes in its PLO save area all operand values which will be used to change the resource at the associated addresses. After the processor has successfully written all of these addresses and associated operand data values into its PLO save area, the processor sets its RI indicator to the RI state, and then stores into the resource unit the data values stored in its PLO save area at the resource addresses also stored in its PLO save area, according to the FC also stored therein. After completing all changes in the resource, the processor sets its RI indicator to the non-RI (resource consistent) state. If the processor should ever fail while executing a PLO instance, it signals its failing condition to the system. Then, a RCR method is executed by any operational processor (acting as a RCR processor) to recover the consistency of the resource unit. The RCR method uses the state of the RI indicator with the failed processor's PLO save area, the FC stored therewith, and the content of the failed processor's PLO save area to restore the consistency of the resource unit.

27 Claims, 11 Drawing Sheets

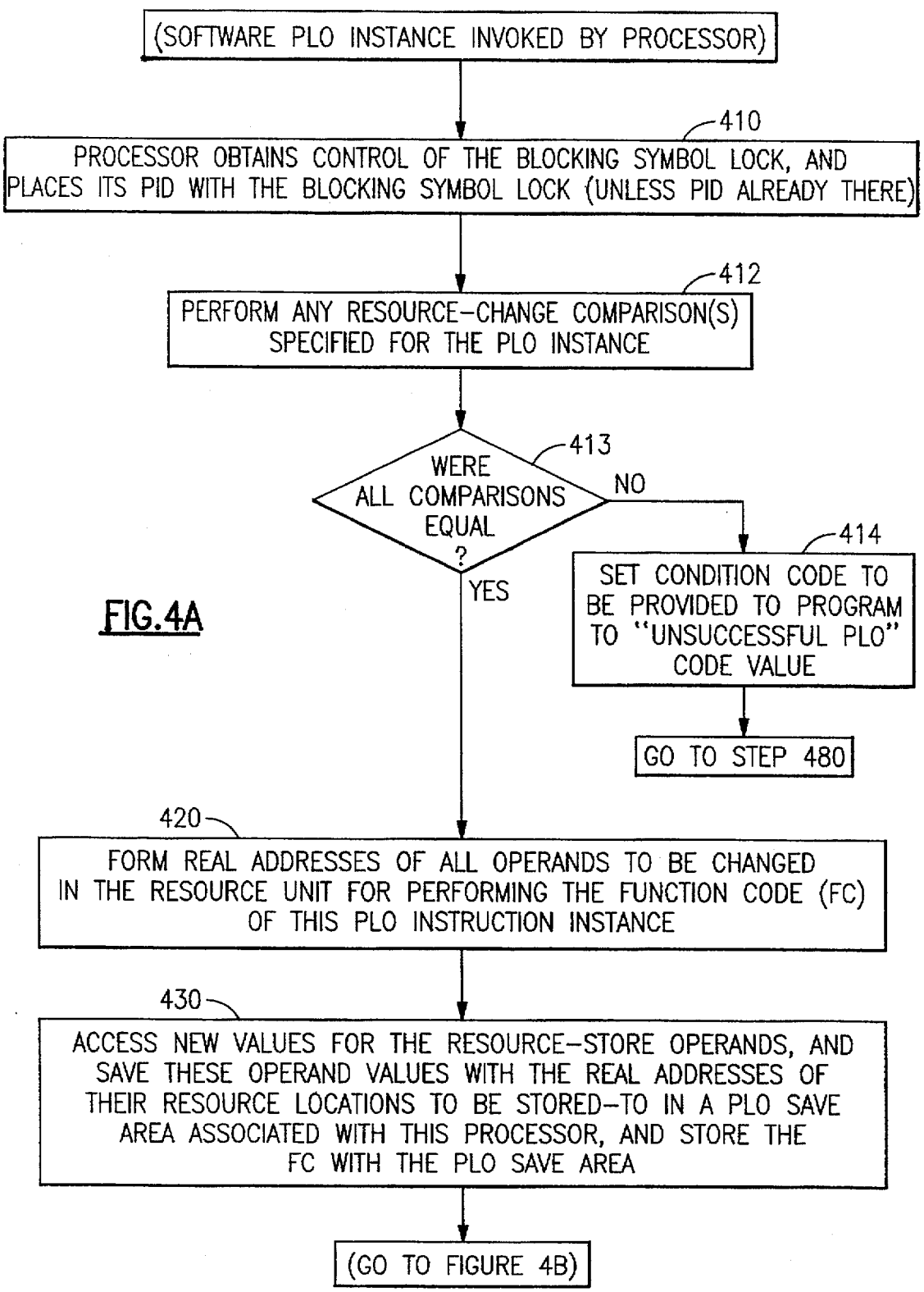

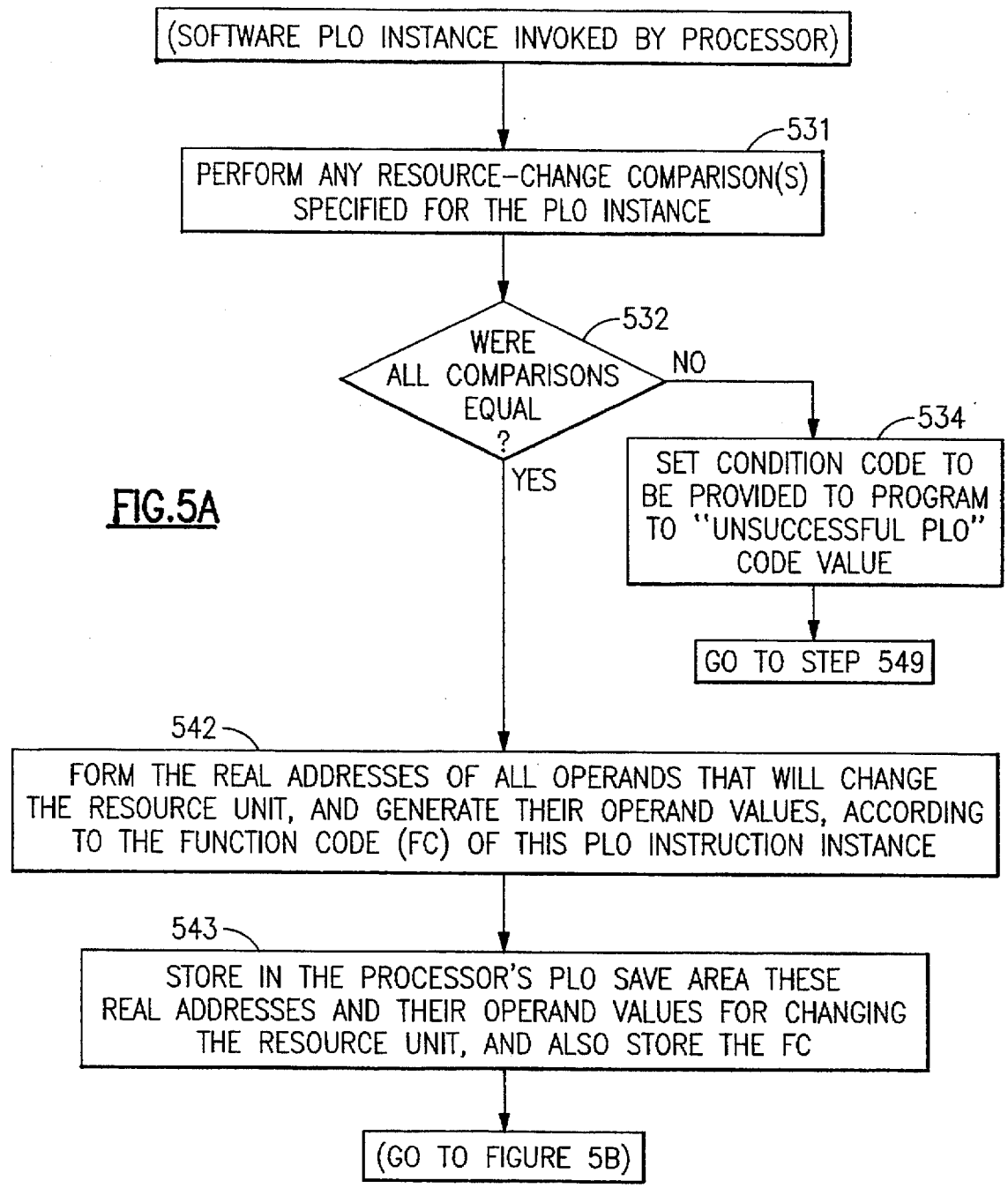

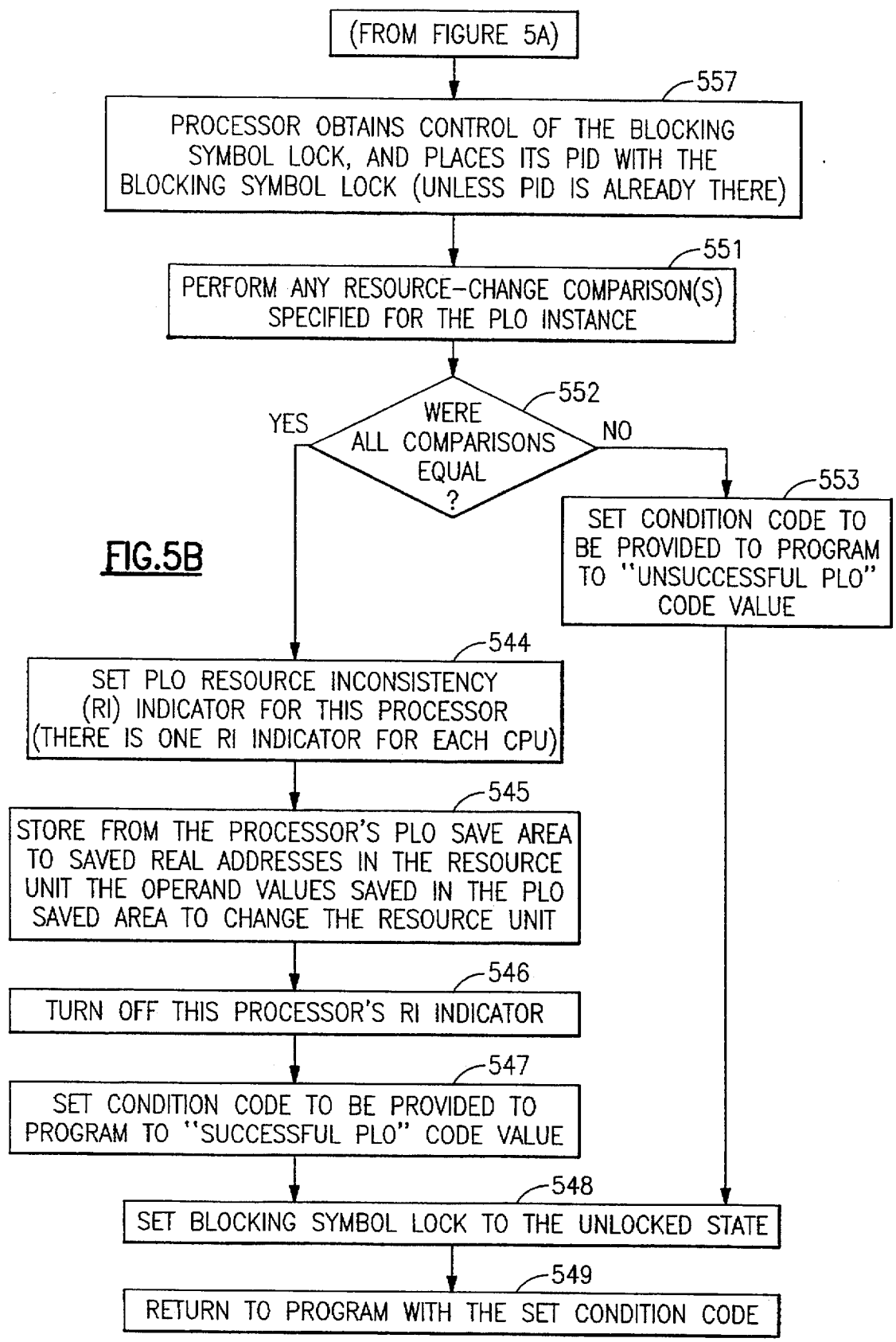

| PLO OPCODE | GR1 | GR2 | GR3 | GR4 | GR5 | GR6 | GR7 |

FIG.11

| | |
|---|---|
| GR1 | (FUNCTION CODE, FC) |
| GR2 | (BLOCKING SYMBOL, BLS) |
| GR3 | (QTAIL ADDRESS) |
| GR4 | (QTAIL CONTENT-LAST ELEMENT ADDRESS) |
| GR5 | (ADDRESS OF ELEMENT Y) |
| GR6 | (ADDRESS OF NEP IN LAST QUEUE ELEMENT) |
| GR7 | (ADDRESS OF ELEMENT Y) |

FIG.12

METHOD OF EXECUTING PERFORM LOCKED OPERATION INSTRUCTIONS FOR SUPPORTING RECOVERY OF DATA CONSISTENCY IF LOST DUE TO PROCESSOR FAILURE, AND A METHOD OF RECOVERING THE DATA CONSISTENCY AFTER PROCESSOR FAILURE

INTRODUCTION

This invention generally relates to a new way of maintaining the integrity of data in a shared memory computer of more than one processor when any processor fails while changing data in a shared data resource, and particularly relates to maintaining shared data integrity when a processor fails while executing a new type of shared data serializing instruction, herein called Perform Locked Operation (PLO) instruction, which has many different variations. PLO instructions are exclusively used in the computer system to change resource units associated with unique blocking symbols. A PLO blocking symbol is defined in each PLO instruction instance changing an associated computer resource unit. Multiple accesses at disjoint, non-contiguous locations within a resource unit may be performed by a single PLO instruction instance of execution on any processor in a computer system. The subject invention enables a computer system to maintain shared-resource data integrity with relative ease when any processor fails during its execution of a PLO instruction instance.

INCORPORATION BY REFERENCE

This application incorporates by reference the entire content of each of the two following applications which teach different processes for executing PLO instruction instances:
1) Ser. No. 08/864,402 entitled "Blocking Symbol Control in a Computer System to Serialize Accessing a Data Resouce by Simultaneous Processor Requests", filed on May 28,1997 by the same inventors (CHANGE NEEDED) as the subject application.
2) Ser. No. 08/864,585 entitled "Processor Associated Blocking Symbol Controls for Serializing the Accessing of Data Resources in a Computer System" filed on May 28,1997 by the same inventors (CHANGE NEEDED) as the subject application.

The above referenced two applications provide different methods and mechanisms for performing serialization when plural PLO instances simultaneously attempt to access the same resource unit. Application Ser. No. 08/864,402 teaches how to associate each blocking symbol with a lock entry independently of the processor executing the PLO instruction instance from which the blocking symbol is obtained. Its preferred embodiment provides the blocking symbol/lock association by hashing the blocking symbol obtained from a PLO instruction instance to locate the associated lock entry. Application Ser. No. 08/864,585 teaches a method using processor-oriented lock entries to sequence PLO instruction instances which simultaneously attempt to use the same blocking symbol (which represents accessing the same resource unit as determined by operands in the PLO instance).

Application Ser. No. 08/864,402 sequences the completion of execution of plural PLO instances concurrently being made by different processors using the same blocking symbol for accessing the same resource. These controls allow simultaneous (concurrent) execution of PLO instruction instances on different processors when different blocking symbols are used by the PLO instruction instances. The blocking symbol is extracted from each PLO instruction instance when invoked by its executing processor. Then the processor hashes the blocking symbol using hardware-microcode (H-M) to generate the location of a lock field in protected storage. The PLO instruction's blocking symbol is associated with a computer resource unit by software providing the PLO instruction, and the blocking symbol then associates the resource with a protected lock through the hashing operation on the blocking symbol. A processor must obtain the lock for a blocking symbol before the executing PLO instruction instance is allowed to make access to or change the resource unit associated with the blocking symbol. The blocking symbol controls the PLO operations by serializing simultaneous PLO instruction access requests being made by multiple processors to the same resource unit using the same blocking symbol to allow only one PLO instruction instance to have exclusive access to the resource at a time.

Application Ser. No. 08/864,585 provides a method of using blocking symbols in processor CLEs (CPU lock elements) to sequence a plurality of PLO instruction instances concurrently executing on different processors in a multi-processor computer system while using the same blocking symbol. Each CLE is associated with a respective processor. Each CLE may contain a blocking symbol (therein called a PLT, program lock token) obtained from a PLO instruction instance currently executing in the associated processor. Each CLE has a blocking symbol lock field H, which is set to held state to indicate when the associated processor has exclusive access to the resource unit associated with the blocking symbol, and contains a wait field for indicating any next processor to get exclusive control of the resource unit because it has a pending PLO instruction using the same PLO blocking symbol.

BACKGROUND

The prior art teaches methods and means for maintaining the continuation of program execution after a processor failure while executing certain types of instructions. Other prior techniques have enabled recovery of some instruction execution failures. Such prior techniques have always had the limitation of not being able to handle all types of processor failures under all circumstances. Shared data resources are found in all business activity, and business is predicated on maintaining the integity of business data in a consistent manner. For example, what if the stock market were to accidentally start off a trading day using a version of some stock prices other than the closing version of the prior day? Or what if a version of the expense records of a business other than the last version at the end of the year were used for calculating income taxes? The dire consequences of failure to maintain data integrity are endless.

As far as is known, one type of problem which has never been adequately addressed in the prior art is the catastrophic consequences which can occur when shared data loses integrity due to processor failure while the processor is changing the shared data. Although processor failure is not a common occurrence today, it should be apparent that failure when a processor has only partly changed data in a shared computer resource may leave the resource in an unknown data state, which could render the data unreliable and result in dire consequences. This problem does not appear to have been adequately addressed in computer design in the past, perhaps due to the fact that the circumstances of data contamination occurrence, and how to prevent, recover from, and generally maintain computer operation in a way that can prevent data contamination, have not been adequately understood.

Shared data integrity is the environment for the subject invention's effort to maintain data integrity under failing processor circumstances. Maintaining non-shared data integrity under failing processor circumstances is better known, and is a much less complex subject.

A general method of instruction recovery from a failed processor is taught in U.S. Pat. No. 5,214,652 to A. Sutton entitled "Alternate Processor Continuation of Task of Failed Processor". Non-shared data can clearly be handled by this patent's alternate processor task continuation method. This patent teaches how a service processor of a computer system may request an alternate processor to continue execution of a program which was being executed by a processor which failed. Before the method in that patent assigns an alternate processor to continue program execution, a service processor of the system processes a signal from the failing processor for indicating the type of error condition occurring for the instruction in execution during the processor failure to enable the service processor to determine if the program can have its execution continued by an alternate processor. For the program to continue, the instruction in execution during processor failure had to be a retryable instruction. If it was not a retryable instruction, the alternate processor method could not be used, and the program processing was ended. Prior serializing instructions generally were not of the type which could be retried due to the fact that they generally required locking of a resource, and the locked state of the resource may be unknown to the processor, or the locking process did not allow an alternate processor to change the state of the lock on a resource held by a failed processor.

The subject invention herein deals with maintaining integrity of shared data resources during processor failure where the failure occurs while the shared resources are being changed with instructions of a type which could not be handled by the alternate processor method taught in the known prior art.

No prior art is known to use blocking symbols for serializing access to shared resources, and therefore no art is known for maintaining data integrity through the eventuality of processor failure during execution of instructions using blocking symbols to serialize access to the shared resources. Known methods of recovery from processor failure may not operate correctly to perform recovery from failure of locked instructions using blocking symbols.

SUMMARY OF THE INVENTION

This invention maintains the integrity of shared data during processor failure occurring while executing a new type of processor instruction, herein called the Perform Locked Operation (PLO) instruction, which uses blocking symbols to serialize processor use of shared resource units. Each PLO instruction has operands which address and may change data in a resource unit associated with a blocking symbol as specified in the instruction. A resource unit comprises one or more software or hardware entities of a computer system usable by executing software instructions.

This invention provides a PLO operand save area for each processor in a computer system capable of executing PLO instructions, and provides a new method of using the processor PLO save areas using a resource-inconsistency (RI) indicator. The processor PLO save areas need not be apparent to software executing on the processors, and they are preferably located in a fast storage not accessible to software.

This invention discovers that the execution of a PLO instance can be divided into six parts, as follows:

1. Operations that can precede the obtaining of the lock specified by the blocking symbol. Specifically, comparisons to PLO operands can be made to determine if the PLO execution can be successful, and, more importantly, the processor PLO save area can be filled in with operand addresses and operand values that will permit recovery if the processor fails while performing stores into the resource. The operand addresses placed in the save area should be real addresses though the operand addresses input to the PLO instruction may be logical addresses, which are addresses that are translated by dynamic address translation (DAT) to real addresses. The placing of real addresses in the save area allows the recovery process, if it should be needed, not to be dependent on registers of the failed processor, or on storage contents used by DAT, in order to perform again the DAT needed to produce the real addresses.

2. The obtaining of the lock as described in application Ser. No. 08/864,402 or application Ser. No. 08/864,585. If the method in application Ser. No. 08/864,402 is used, this step also consists in storing by the processor of a processor identifier to identify the processor that holds the lock. In any one computing system, only one of the two methods for obtaining a hardware lock for a blocking symbol is used.

3. Comparisons to PLO operands to determine if the PLO execution can be successful. It is necessary to perform these after obtaining the lock. Their performance in (1) can be considered to be optional. They may be performed there to allow avoidance of obtaining the lock and to allow quickly ending the instruction execution when the execution cannot be successful. They must be performed here since the PLO operands may have been changed (by a PLO executing on another processor) after the comparisons in (1) and before the obtaining of the lock in (2).

4. Setting on the resource-inconsistency (RI) indicator in the PLO save area of the processor.

5. Performing the stores that are to be performed by the PLO instruction.

6. Setting off the RI indicator, and releasing the lock. If the processor fails before it holds the lock, no recovery is necessary since storage cannot have been changed. If the processor fails while holding the lock but when the RI indicator is off, the only recovery necessary is to release the lock. Either storage has not been changed, or it has been completely changed. If the processor fails while holding the lock and when the RI indicator is on, the necessary recovery is to perform all the stores called for by the addresses and values saved in the processor PLO save area and then to turn off the RI indicator and release the lock.

Note that if the processor fails while holding the lock and when the RI indicator is on, it cannot be known which of the called for stores have been performed. If the processor would normally make a "mark on the wall" to indicate a particular store and then perform the store, the processor may fail after having made the mark but before performing the store. Conversely, if the processor would normally perform a store and then make a mark to indicate the store, it may fail after performing the store but before making the mark. The only safe solution is to perform all stores during recovery if the RI indicator is on. This may result in repeating stores that were in fact performed successfully before the processor failure occurred.

It should be noted that in no case can recovery consist in restoring storage contents to what they were at the beginning of the PLO execution. The PLO technique requires that all processes that change the resource associated with a PLO blocking symbol do so only by using PLO. This is the only way to guarantee the integrity of the resource. PLO must also be used if it is necessary to fetch coherent values from disjoint locations in the resource, to ensure that another process, using PLO, does not update one of the locations but not another during the time the fetching by the first process is occurring. However, it is reasonable that a process should be able to fetch from a single location in the resource without using PLO but by instead using a simple Load instruction since, in this case, there is no concern for coherent contents of multiple locations in the resource. The process may make some decision based on what it fetches. If what it fetches was stored by PLO, and then that PLO processor fails and the recovery process restores the contents of the location that existed before the store by PLO, the decision by the fetching process will have been turned into a wrong decision by the recovery.

The method of this invention is illustrated by the following simple example. Assume a single-threaded queue and an associated location, Qtail, that contains the address of the last element on the queue. A queue element contains a next-element-pointer (NEP) location that contains the address of the next element on the queue. Assume that the last element on the queue is currently element X, and that a program is to enqueue element Y as a new last element following element X. PLO, with a suitable function code, can be used to perform this enqueueing operation in a multiprocessing system in which multiple processes may concurrently be enqueueing elements on, and dequeueing elements from, the queue.

The PLO operation specified by the function code can be called in this instance compare and swap and store. The PLO operation is to replace the contents of Qtail with the address of element Y if Qtail contains the address of element X (the compare and swap), and, if that is successful, store the address of element Y in the NEP location in element X (the store).

Assume a PLO instruction using operand addresses and values in registers as opposed to in a parameter list (since so few registers are required in this case). (However, usually we speak of PLO as having a parameter list.)

The program prepares to issue the PLO instruction by loading the PLO registers as follows: (1) the function code into a first register, (2) the blocking symbol into a second register, (3) the address of Qtail into a third register, (4) the contents of Qtail, which we call the address of element X, into a fourth register, (5) the address of element Y into a fifth register, (6) the address of the NEP location in element X into a sixth register, and (7) the address of element Y into a seventh register. The address of element Y is in two registers to allow a general compare and swap and store function instead of the one specifically required in this example.

If the contents of the fourth register (the contents of Qtail) are nonzero, the program issues the PLO instruction. If the contents are zero, the queue is currently empty, and element Y must be enqueued differently than described in this example.

During the first of the six parts of the PLO instruction execution, PLO may compare the contents of the fourth register to the contents of the location designated by the third register, that is, it may determine if Qtail still contains the address of element X. If Qtail does not, PLO ends its execution with a condition code that indicates an unsuccessful operation. The program must now reload the fourth and sixth registers and reissue the PLO. What happened in this case is that, after the program originally loaded those registers, another program (process), being executed by another processor and using PLO, changed the last element on the queue.

During the remainder of the first of the six parts, PLO stores in its processor's PLO save area the contents of the first (function code), third (Qtail address), fifth (element Y address), sixth (NEP location in element X address), and seventh (element Y address) registers.

PLO obtains the lock during the second of the six parts, and it stores its processors's id with the lock if necessary because of the locking method used.

During the third of the six parts, PLO compares the contents of the fourth register to the contents of the location designated by the third register, that is, it determines if Qtail still contains the address of element X. If Qtail does not, PLO releases the lock and ends its execution with a condition code that indicates an unsuccessful operation. The program must now reload the fourth and sixth registers and reissue the PLO. What happened in this case is that, after the program originally loaded those registers and before the PLO instruction obtained the lock, another program (process), being executed by another processor and using PLO, changed the last element on the queue. The PLO on the other processor obtained the lock before the PLO on this processor.

If Qtail still contains the address of element X, then, during the fourth of the six parts, PLO sets on the RI indicator.

During the fifth of the six parts, PLO stores the address of element Y from the fifth register into Qtail, and it stores the address of element Y from the seventh register into the NEP location in element X.

During the sixth of the six parts, PLO turns off the RI indicator releases the lock, and sets the condition code to indicate a successful operation.

It is to be noted that the RI off and on states indicate whether the storing by a PLO instance should be completed (by being performed entirely again) after failure of the processor executing the PLO, with this completion being done by a resource-consistency-recovery (RCR) processor.

If processor failure occurs when the RI indicator is on, the failed processor's PLO save area contains all PLO change data for the resource unit. Then another processor (accepting the burden of being a resource-consistency-recovery processor) does all of the changing of the resource unit for the failed PLO instance by merely copying the data items from that PLO save area into the resource unit at locations defined by the real addresses in the save area associated with the data items stored therein. A RCR processor also must change the locked state of the resource unit to the unlocked state, so that the resource unit may be accessed and changed by execution of another PLO instruction instance by any operational processor in the system.

Each of the real addresses stored in a processor's PLO save area locates a contiguous sequence of data in the resource unit of the PLO instance. Generally, the contiguous sequences of data located by different real addresses in the PLO save area are generally non-contiguous with each other in main storage, although they may be contiguous with each other in rare cases. Therefore, a single PLO instance may store any number of non-contiguous data items for changing a resource unit in any required way.

Although real addresses are stored in the processor PLO save areas (for maximum convenience in the preferred embodiment described in this specification), it should be understood that this invention also comprehends storage of virtual address locations in the resource unit instead of real addresses. Use of real addresses is preferred because it enables the burden of address translation to occur in the normal manner of execution of the PLO instruction as determined by its function code (FC). The use of virtual addresses would throw the burden of address translation onto the recovery processor, requiring it to have access to the registers of the failing processor.

Hence, each processor PLO save area receives the new operand values specified by a parameter list (or registers) for each PLO instruction instance executing on its associated processor before any change is made to the resource unit associated with the blocking symbol specified in the executing PLO instruction instance. Maintenance of the consistency of a resource across occasions of processor failure is dependent on a resource-consistency-recovery processor being able to detect the state of the resource-inconsistency indicator (RI) for a failed processor which is holding a lock on the resource.

The resource-consistency-recovery processor operations of this invention support hashed locks shared by plural processors, as described and claimed in previously-cited application Ser. No. 08/864,402, by this invention additionally storing a processor identifier with each lock when the lock is set on, and invalidating the processor identifier when a processor sets the lock off.

The resource-consistency-recovery processor operations of this invention also support the processor lock method of application Ser. No. 08/864,585, in which each lock is permanently associated with a particular processor. With these locks a processor identifier is already provided with each lock and it need not be provided or controlled by this invention.

This invention may be viewed as adding a subprocess to the methods disclosed in either of these above identified PLO applications 08/864,402 or 08/864,585 to support them should a processor fail while using either of these methods. Parameter lists and function codes (FCs) are defined in the context of these incorporated applications.

Alternatively, this invention may be viewed as having the locking and unlocking methods of the above identified PLO applications as subprocesses.

The PLO completion recovery process is invoked when a service processor of the computer system detects the failure of a processor executing a PLO instance. The service processor shuts down the failed processor and signals an operational processor to temporarily become a "resource-consistency-recovery processor" for completing the interrupted PLO store operations to the locked resource unit of the failed processor's execution of the PLO instruction instance, and setting off the lock on the resource if it had been set on by the failed processor, and still remains on. When the resource-consistency-recovery processor is designated, the service processor signals to it the processor identifier of the failed processor (which is needed to find the failed processor's save area, and also may be needed to find any lock for a resource that may have been set on by the failed PLO instance). If no resource was locked by a failed processor, then no processor recovery is needed for the resource.

The detection of whether the failed processor is the holder of a set-on lock state is done in different ways for the different methods of associating the locks with the processors accessing the resource units. In any one system, only one method of obtaining a hardware lock for a blocking symbol is isused, so the recovery processor will use the correct method in its recovery operation, since the failed processor was using the same method as that normally used by the processor doing the recovery. In the case of shared, hashed blocking symbol locks, as in application Ser. No. 08/864,402, this is done by the resource-consistency-recovery processor comparing the failed processor's identifier to each processor identifier associated with any set-on lock. If no set-on lock has a processor identifier equal to the identifier of the failed processor, then the failed processor was not holding any lock and no lock need be released by the resource-consistency-recovery processor. However, if a set-on lock is found having the failed processor's identifier, then the failed processor had exclusive access to the resource when it failed, and the lock on the resource must be set off by the resource-consistency-recovery processor after the resource-consistency-recovery processor completes all storing that is required by the resource-inconsistency indicator of the failed processor, if it is in the on state.

In the case of each processor having its own processor CLE, as in application Ser. No. 08/864,585, the recovery processor determines the address of the failing processor's CLE and checks the state of its lock field. If the CLE lock field is in the held state, then after the resource-consistency-recovery processor completes all storing that is required by the setting of the resource-inconsistency indicator of the failed processor, the waiting-CLE field is cleared and the lock is set to the not-held state, and the waiting-CLE is accessed and checked. If another processor is waiting for the PLT held by the failing processor, the resource-consistency-recovery processor grants it control of the PLT by setting its CLE lock field to the held state. If the failing processor's CLE is not in held state, but its PLT field is not empty, its CLE is in the waiting-CLE chain for the PLT. In this case, the CLE must be removed from the chain since the processor is not capable of performing its PLO instance. A search of all processor CLEs is made to find the CLE that holds the PLT waited for by the failing processor. The chain is followed from that CLE until the failing processor's CLE address is found in another processor's CLE wait field. Then the chain is mended around the CLE of the failing processor. The preceding processor CLE is made to chain to the successor of the failing processor's CLE, or becomes the end of the chain if the failing processor had no successor in the chain (its waiting-CLE field is zero).

When the resource-consistency-recovery processor completes the recovery action, it returns to whatever processing operation it was doing when it was temporarily interrupted to do the recovery. This action is transparent to the work that was interrupted.

BRIEF DESCRIPTION OF DRAWINGS

The subject matter which is regarded as the invention is particularly pointed out and distinctly claimed in the claims at the conclusion of the specification. The foregoing and other objects, features and advantages of the invention will be apparent from the following detailed description taken in conjunction with the accompanying drawings which are:

FIGS. 4A and 4B are flow diagram of an embodiment of a RCR PLO instruction execution process. This novel PLO execution process enables later consistency recovery for the data resource, even though the data resource is incompletely changed by the PLO instruction execution due to failure of the processor executing the PLO instruction before completion of the PLO instruction. The flow diagram in FIGS. 4A and 4B stores a PLO save area after a lock is obtained on a resource to be changed.

FIGS. 5A and 5B are a flow diagram of the preferred embodiment of RCR PLO instruction execution processing by a failed processor for enabling a later recovery by another processor of the consistency of the resource being changed by the failed processor. Like the method in FIGS. 4A and 4B, the method in FIGS. 5A and 5B has the failed processor prepare a PLO save area for later use by a resource-consistency-recovery processor which can recover the integrity of the resource which may have been left in consistency-damaged state by the failed processor. The flow diagram in FIGS. 5A and 5B stores the PLO save area before the lock is obtained on the resource to be changed. An advantage of the RCR PLO instruction execution method in FIGS. 5A and 5B is that it holds the lock on the resource for a shorter time than the RCR PLO instruction execution method in FIGS. 4A and 4B when the processors are successfully executing the RCR PLO instruction execution methods.

FIG. 9 completes the recovery process by removing the CLE address of the failed processor from any wait chain of CLEs representing processors currently waiting for the resource which was being changed by the PLO instruction execution of the failed processor.

FIG. 11 shows a format of a PLO instruction used in the QUEUE example.

FIG. 12 shows general registers containing operands of the PLO instruction used in the PLO instance being executed by the processor in a described QUEUE example.

DESCRIPTION OF THE DETAILED EMBODIMENT

Figure 1:
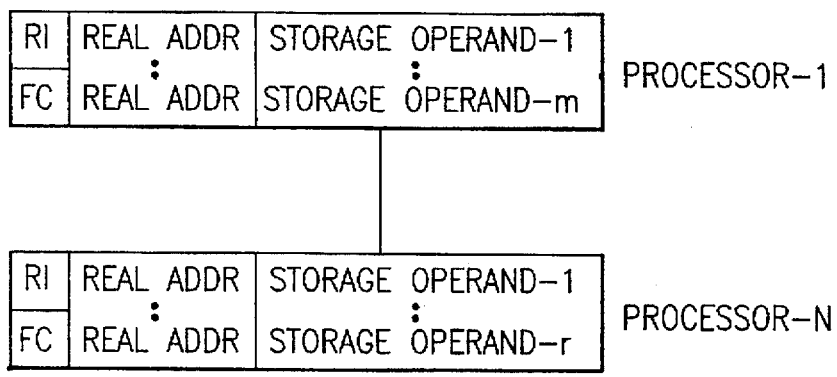
FIG. 1 resents the PLO save areas in a protected storage of a computer system used by a preferred embodiment of the invention.

FIG. 1 illustrates the storage used by each of processors 1–N to save the new, intended content of resource fields that will be changed during execution of a PLO instruction instance, as specified by the function code (FC) of the PLO instance being executed. Each processor has its own unique PLO save area. The save areas of all processors are in a protected storage area (called "hardware system area", HSA, in IBM S/390 mainframe systems). The processor areas shown in FIG. 1 are used in response to failure by any of processors 1–N during execution of a PLO instance to complete a sequence of stores that was started but not completed during a partial PLO execution.

After interpreting the FC, the processor saves in its respective PLO save area in the HSA the FC and the real address and new content of all operands that are specified by the FC to change during the PLO instance of execution. The FC will tell a resource-consistency-recovery processor how to interpret and use the contents of the save area if recovery is necessary. The new content is obtained during PLO operation by using fetch operand addresses and/or values specified in the parameter list and processed according to the FC defined in the PLO instance.

Each processor PLO save area also contains a resource-inconsistency (RI) indicator. The RI indicator is on if storing was begun and not completed, or is off if storing was not begun or was begun and completed. When RI is on, storing by the resource-consistency-recovery processor is necessary. When RI is off, storing by the resource-consistency-recovery processor is not necessary.

Figure 2:
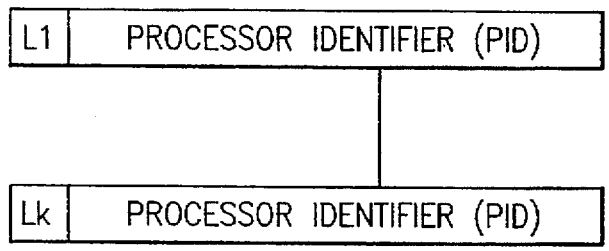
FIG. 2 resents a set of lock fields with associated processor identifiers located by hashing PLO blocking symbols.

FIG. 2 shows the set of lockwords L1–Lk used in the hash embodiment described in related application Ser. No. 08/864,402 shared by all processors to serialize PLO operations on specific blocking symbols. A processor obtains a blocking symbol (called a BLS in that application) specified in the PLO instance, and the processor hashes the BLS to locate a required one of the lockwords L1–Lk, and only proceeds with PLO execution if the processor can lock the lockword (called obtaining the lock, or holding the lock) to obtain for the processor exclusive access to the resource required during the PLO instance, as described in application Ser. 08/864,402. This application provides, with each lockword in FIG. 2, a processor identifier field (PID) to identify which of processors 1–N in the system is currently holding a lock. If any of processors 1–N fails while executing a PLO instance, another of processors 1–N is used to execute a recovery procedure described in this application to release a lock held by the failing processor.

Figure 3:
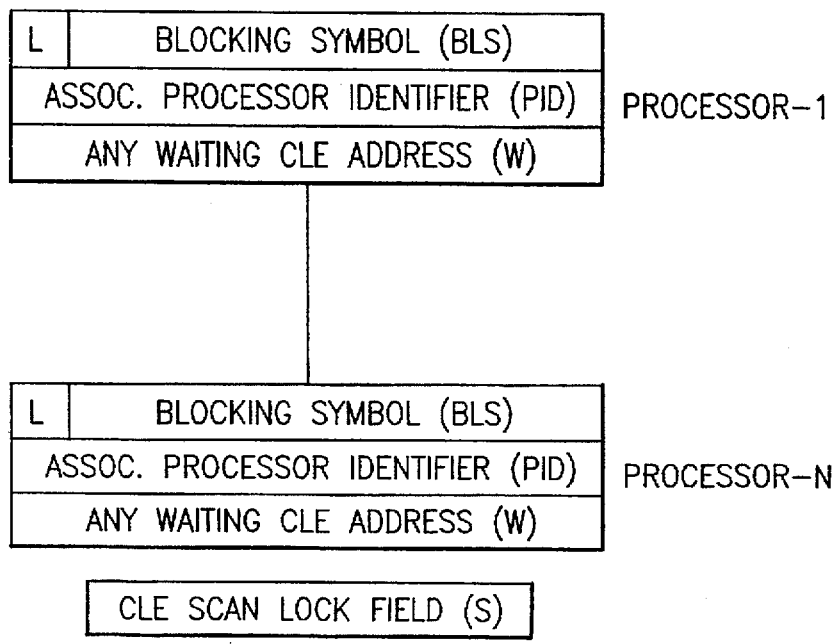
FIG. 3 represents a set of CLEs (CPU lock entries) respectively associated one-for-one with the processors in the computer system, in which each CLE contains a blocking symbol (called a PLT) field, an associated processor identifier, and a waiting field for locating another CLE associated with any next processor waiting for the resource represented in the PLT field. A CLE scan lock field S serializes access to the CLEs by the processors.

FIG. 3 shows a set of CLEs (CPU lockword elements), one per processor, disclosed in related application Ser. No. 08/864,585, in which a respective CLE is assigned to one of processors 1–N to provide an internal lock word, which indicates if the processor holds a lock L for the blocking symbol in the BLS field, or is waiting for control of the blocking symbol. L is set to a state which indicates whether or not the lock is held. The BLS field indicates the blocking symbol being held or waited for. The waiting-CLE address W, if not zero (empty), addresses the CLE of another processor next waiting for the same blocking symbol (BLS). Since each CLE is uniquely associated with a specific processor, no PID need be stored, but a PID is provided in each processor's internal lockword which may be used to simplify the recovery process performed by a processor doing PLO recovery after another processor's failure. The PID is used in the process of removing a failing processor from a wait chain of processors queued for use of the same blocking symbol (BLS). The CLE scan lock field S serializes access by the processors to the set of of CLEs so that only one processor may process the CLEs at any one time.

Figure 4B:
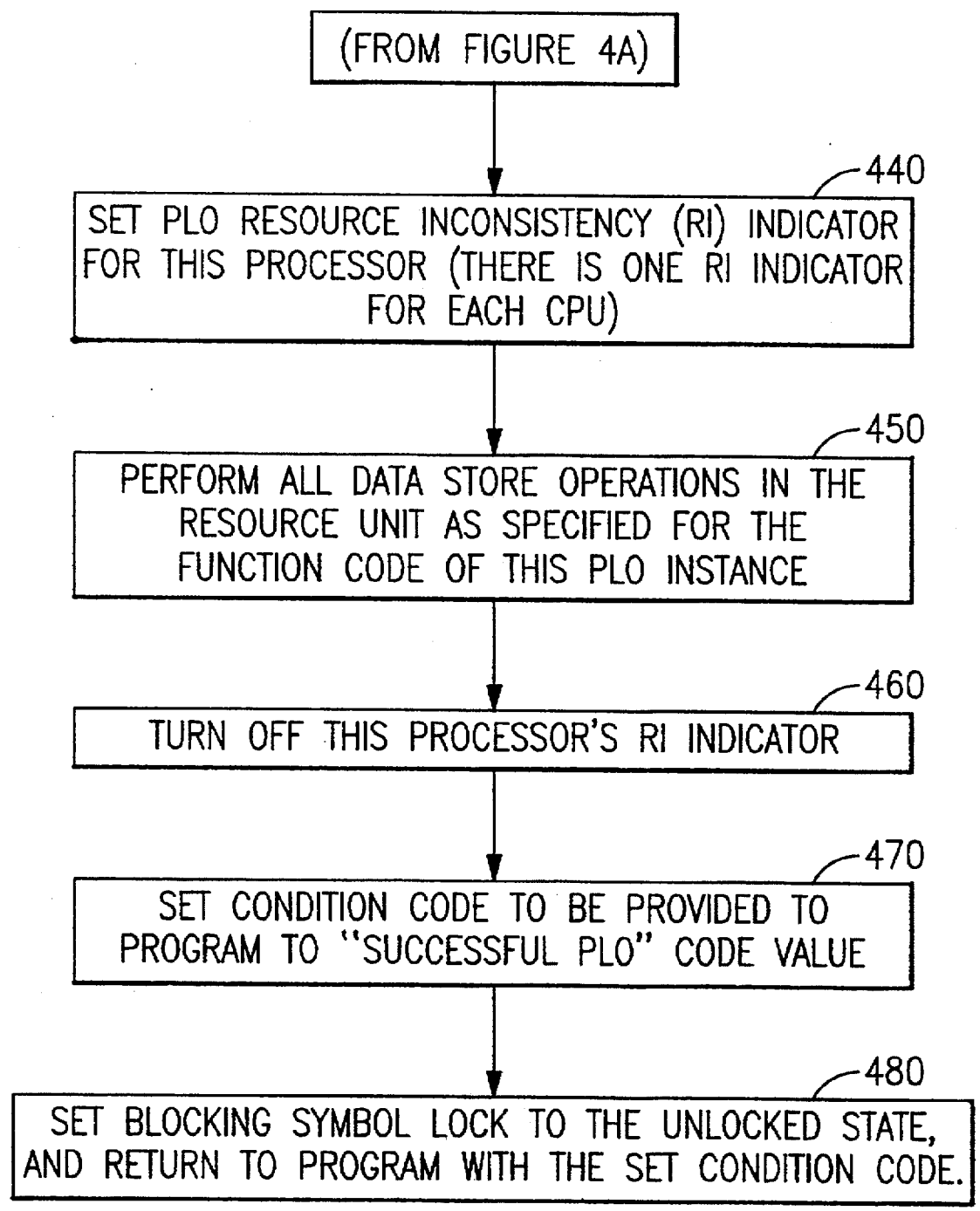

The embodiment as depicted in FIGS. 4A and 4B, and in FIGS. 5A and 5B are extensions of the embodiments of the PLO process disclosed in related applications Ser. No. 08/864,402 and Ser. No. 08/864,585. The subject embodiment is inserted into each of the embodiments of these related applications to enable any of the related embodiments to recover from a processor failure occurring during execution of a PLO instruction instance. In this embodiment, the locking and locking methods for the blocking symbol taught in those related embodiments are used. Thus, steps 410 on FIG. 4A and 557 on FIG. 5B use the steps of Ser. No. 08/864,585 for processor-associated locks or the steps of Ser. No. 08/864,402 for hashed-to locks. These steps are not repeated here to avoid complexity in the description of the recovery process. Similarly, steps 480 in FIG. 4B and 548 in FIG. 5B release the blocking symbol lock using the logical steps of the earlier related applications, for processor-associated or for hashed-to locks as the case may be.

In the subject application's FIG. 4A, step 410 represents the processor operation for an executing PLO instruction instance to obtain the system lock for the blocking symbol specified in the PLO instance. For the hash-lock embodiment only, the processor places its own processor identifier (PID) into the lock word that it has obtained; in the CLE embodiment, the processor is already identified with the lock. In both related embodiments, at step 412, the processor performs any resource-change comparisons required by the function code of the PLO instance. These tests insure that the resource is in the state corresponding to the PLO operands prepared by the program to be used in the PLO execution. If any required comparison fails, the resource has been changed between the time the operands were prepared and the time of their use, and the changes must not be made to the resource using these operand values. Instead, the program must reinitialize for PLO execution and reissue the instruction. At step 413, the processor checks that all comparisons were equal. If not, the processor sets the condition code to be returned to the program to an "unsuccessful" setting, and goes to step 480. If all comparisons were equal, the processor performs step 420, where the real storage addresses of all operands that are to be stored into (including those specified in the PLO instruction by means of virtual addresses) are formed. The processor records in step 430, in its PLO save area, the FC and these addresses of operands that will change in the resource represented by the current PLO blocking symbol. The new content of those operands that will result from execution of a PLO instance is accessed and is stored in the save area with the PLO real addresses of the operands. Should the processor fail while in the process of making the stores required by a PLO instance to the resource, a resource-consistency-recovery processor can perform the store operations specified in the save area, and bring the resource to a consistent state, by essentially performing the data store operations of the PLO instance that was being performed by the failed processor when it failed.

In FIG. 4B, at step 440, the processor sets the resource-inconsistency (RI) indicator in the save area for this processor. Should the processor fail with this indicator in the on-state, the resource may be in inconsistent state because all the stores required by the ongoing PLO instance may not be completed. This indicator can be used by a resource-consistency-recovery processor to indicate whether or not it must perform the stores indicated in the failed processor's PLO save area. At step 450, all the store operations required by the PLO instance function code are performed. At step 460, all data operations specified for the FC of this instance have been performed, so the resource-inconsistency indicator RI is turned off. The resource is in consistent state. At step 470, the condition code to be provided to the program is set to "successful PLO" value. At step 480, the blocking symbol lock is set to the unlocked state, and the processor returns to the program for normal processing of the next instruction, providing the program with the proper condition code, as set earlier. FIGS. 5A and 5B show the preferred embodiment for processing within the PLO instruction to prepare for possible recovery action by another processor should the processor performing PLO fail while making the changes to the shared resource operands of the PLO instruction. This method is an alternative to that depicted in FIGS. 4A and 4B and is preferred because it reduces the time that the locks are held during a PLO execution, in general.

In step 531, all conditional tests required to be performed by the function code of the PLO instance are performed in order to find out if it is already impossible to perform the PLO instruction successfully. This is a pre-test to avoid getting the lock if a successful PLO is already impossible due to a PLO execution on a different processor. At step 532, the processor checks that all the tests were successful. If any test is not met, step 534 provides an unsuccessful PLO condition code, and goes to step 549 for a return to the program, which must reinitialize for a reexecution of the PLO instruction.

An example of such a test is one or more comparisons specified to be performed by a compare and swap PLO function code. Such an example is described in the Summary. The purpose of the test(s) is to ensure that the shared storage resource is in the expected state, i.e., the state which prevailed when the parameters of the current PLO instance were prepared by the program issuing the PLO instance. PLO functions will often specify comparisons for this purpose. Unless the comparisons specified for the FC of the current PLO instance are all equal, the processor will not perform any PLO store operand functions, returning a failed-PLO condition code to the issuing program. In such a case, the program must establish the new version of the required parameters in order to execute a successful PLO to change the shared resource from its newly modified state. This can occur when another program has successfully executed a PLO instance during the time that the program that issued the current instance was preparing the operands of its own instance. PLO then fails because the expected state of the resource, as reflected in the PLO parameters, is no longer current because the PLO instance of the other program has executed after the program of the current instance has started preparing its PLO operands, but before its PLO has executed, or before its PLO has obtained a lock during the PLO execution. Step 531 performs any such tests specified by the FC of the current PLO instance to ensure that the resource is still in the state assumed by the program issuing the current instance. If that state has changed since the program established the operands of the current instance, that program must be notified that the resource has changed, so that it can reinitialize the PLO parameters for its instance. This is done by setting a failed-PLO condition code for return to the program at step 534, and going to step 549 for the return.

For example, if the PLO is of the Compare and Swap variety, the Compare is performed. If it is not an equal compare, the shared resource has been changed since the program prepared to issue PLO, so the program must recalculate the addresses and compare value(s) to be used in the PLO and must reissue the PLO with the new parameters. If all the tests are successful, the FC and the real addresses of the store operands of PLO within the resource for the function code of the PLO instance are formed in step 542, and placed into the PLO Save Area of the executing processor with the intended new values of the store operands that will result from successful execution of the PLO instruction instance, in step 543. The Save Area (FIG. 1) is formed for a PLO instance before the Blocking Symbol lock is obtained in this embodiment in order to reduce the time the lock is held, in order to reduce the conflicts that can occur in the obtaining of the locks, and the processor non-productive wait time that that would entail. Control passes to step 557 on FIG. 5B. Now that the Save Area has been made to reflect the action that is to be performed by the current PLO instance, the processor obtains control of the lock for the Blocking Symbol, and, where these locks are shared by processors, the processor identifier is stored with the lock obtained, at step 557. In step 551 the conditional tests required by the function code of the PLO instance are made again, to ensure that conditions have not changed since the earlier pre-test (at step 531). If any test is unsuccessful now, the PLO instruction condition code is set to the unsuccessful value at step 553, and control passes to step 548 to have the lock for the Blocking Symbol released in accordance with the locking assignment method being used. After the lock is released, control is returned to the program that issued PLO, providing the specified condition code value, in this case an unsuccessful PLO execution value.

If at step 552 all tests were successful, the processor sets the resource change indicator to the on state at step 544 to indicate that the processor is in the resource-changing window of execution. Since the lock is held and the tests were successful, the PLO Save Area correctly reflects the results of a successful PLO execution for this PLO instance, and can be used by a resource-consistency-recovery processor should the processor executing PLO fail while the RI indicator is on. If the processor fails while the RI is in the on state, the recovery methods of this embodiment will complete the PLO instance on a resource-consistency-recovery processor. At step 545, performs all data store operations specified for the function code of the PLO instance. At step 546, all store operations to the shared resource have been completed, so the resource change indicator RI is set to the off state. At step 547, the condition code to be provided to the program issuing the PLO instruction is set to the successful PLO value for later delivery to the program. At step 548 the lock for the blocking symbol is set to the unlocked state. At step 549, the processor returns to the program's execution at the instruction following the PLO instruction, providing the set condition code value.

Figure 6:
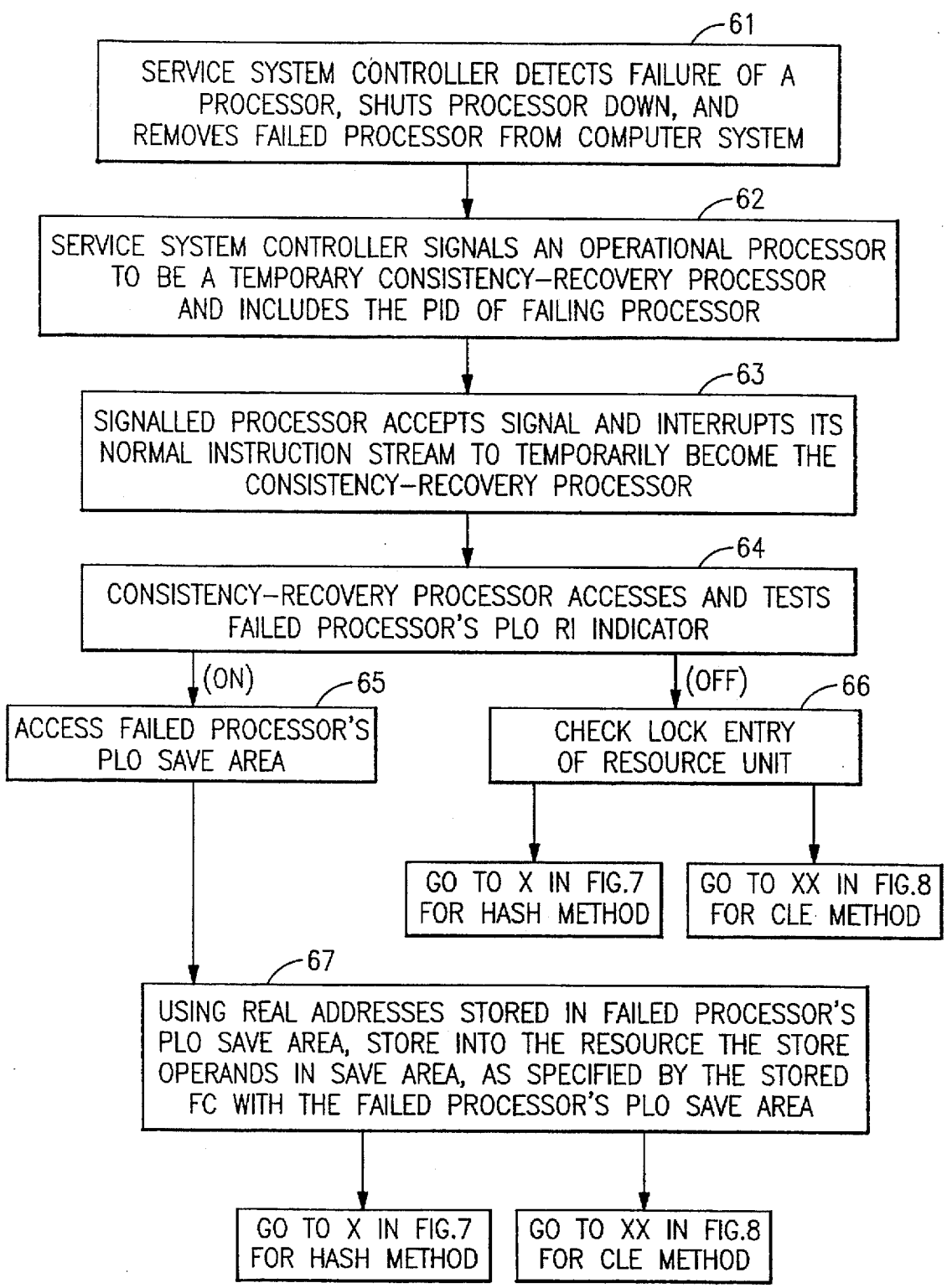
FIG. 6 a flow diagram of an initial part of a recovery process being performed by a resource-consistency-recovery processor utilizing the contents of a PLO save area stored by a failed processor during execution of a PLO instruction. The resource-consistency-recovery processor may be any operational processor in the computer system.

FIG. 6 describes the process of recovering the system from the failure of a processor while processing a PLO instruction. At step 61 the system service controller (SC) of a computing system, which is a well-known computer entity in the prior art, detects that a processor is failing and cannot recover itself. The SC shuts down the failing processor and configures it out of the system, which process is in the prior art. Then in step 62 this invention uses the SC to signal the PID of the failing processor to one or more operational processors, requesting one of the latter to act as a resource-consistency-recovery processor. The first of the operational processors to signal acceptance of a temporary role as a resource-consistency-recovery processor handles the PLO recovery of the failed processor in case that processor had failed during a PLO instance. This is done by step 63, in which one of the operational processors in the system accepts the signal between its execution of instructions in its own instruction stream. It interrupts its instruction stream by saving its current status so that it may resume its own instruction stream at a later time, after completing recovery processing for the failed processor. At step 64, the resource-consistency-recovery processor tests the failing processor's resource-inconsistency (RI) indicator in that processor's PLO save area. If the RI indicator is in the off-state, the failing processor was not executing the data store operations of a PLO instance when it failed, and the recovery method passes from step 64 to step 66 which transfers control to point X in FIG. 7 if the PLO method is using hash located locks as disclosed in Ser. No. 08/864,402. If instead the method is using the PLO system disclosed in Ser. No. 08/864,585 of one PLO lock per processor, the method continues from step 66 to entry point XX in FIG. 8. If the PLO resource-inconsistency indicator is on (set on by step 440 in FIG. 4, or by step 544 in FIG. 5B) the failed processor had started the data operations of a PLO instruction execution instance but had not completed them when it failed, because the failed processor would have set off the resource-inconsistency indicator if it had completed data operations of the PLO instruction.

Therefore when the inconsistency indicator RI is on, the resource-consistency-recovery processor, in step 65, locates and accesses the failing processor's PLO save area. Then in step 67, the resource-consistency-recovery processor accesses the save area of the failed processor containing the real addresses of operands of the failed PLO instance and, and as specified by the FC in the PLO save area, uses them to update the content with the values from the save area at those addresses in the resource to reflect the content they would have had if the PLO instance on the failed processor had completed successfully. These values are in the Save Area with the addresses to which they are to be stored. The save area contains the FC of the interrupted PLO instruction on the failed processor. This is interpreted during recovery to indicate the number of store operands in the save area that must be stored to the resource to ensure its internal consistency. After consistency recovery has been completed, the programs running on other processors, which programs require the same resource unit, can continue execution using that resource, since the resource is then known to be in consistent state. Then the process in FIG. 6 goes to its exit X which enters FIG. 7 in the hash-to-lock application, or goes to exit XX for entering the process in FIG. 8 in the lock-per-processor application, in order to release the lock for the blocking symbol held by the failed processor, so that other processors may access the resource with PLO instructions.

Figure 7:
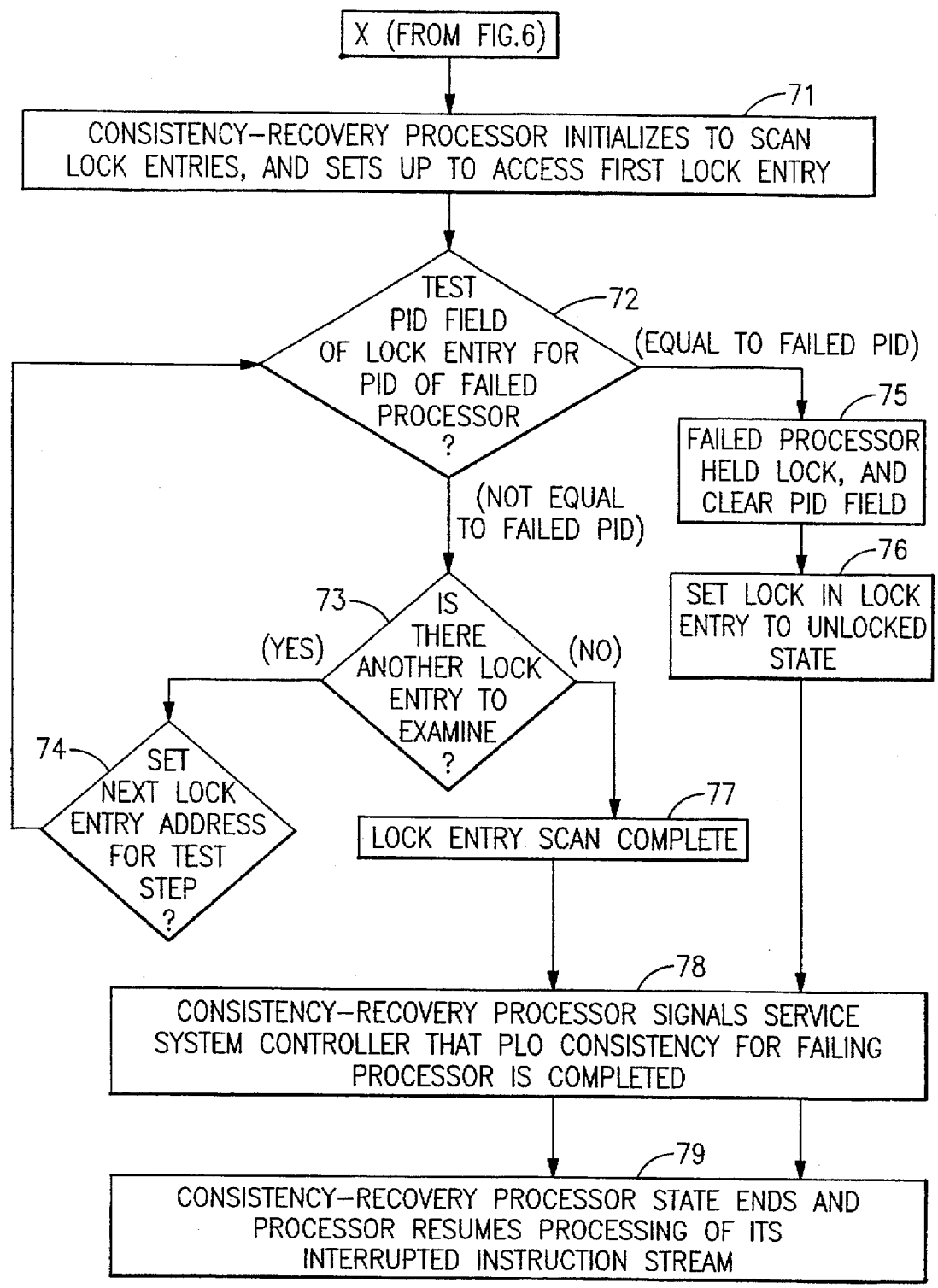
FIG. 7 is a flow diagram of a later part of the recovery process initiatially performed in FIG. 6 when the failed processor was executing a PLO instruction using the hashing method of PLO instruction execution disclosed in related specification Ser. No. 08/864,402.

FIG. 7 shows a process for recovering lockwords in the BLS-hashed-to-lock system, as described in application Ser. No. 08/864,402. At step 71, the resource-consistency-recovery processor initializes a scan loop for scanning the PLO lockwords of the system shown in FIG. 3. The scan loop obtains the address of the first lockword, and sets it as the current lockword address. At step 72 using the current lockword address, the PID field of the lockword is tested to ascertain whether it contains the PID of the failed processor. If the lock entry is not held by the failed processor, control passes to step 73, where a determination is made as to whether there are more processor lock entries to be examined. If there are, control passes to step 74 to set up the address of the next PLO lock entry, and control goes back to step 72 to continue the scan of processor enteries. If, at step 73 it is found that all lockwords have been examined, control passes to step 77 since the scan is complete. If at step 72, the failed PID is found in a processor entry, control passes to step 75, where the PID field of the lockword is set to zero. At step 76, the lock is released by setting the lockword state to not-held state (i.e. available state). Control is passed to step 78 where the recovery processor notifies the service system controller that PLO instance recovery is complete for the failed processor. At step 79, the resource-consistency-recovery processor assumes its processing role and resumes the processing of its instruction stream that was interrupted when it became the resource-consistency-recovery processor.

Figure 8:
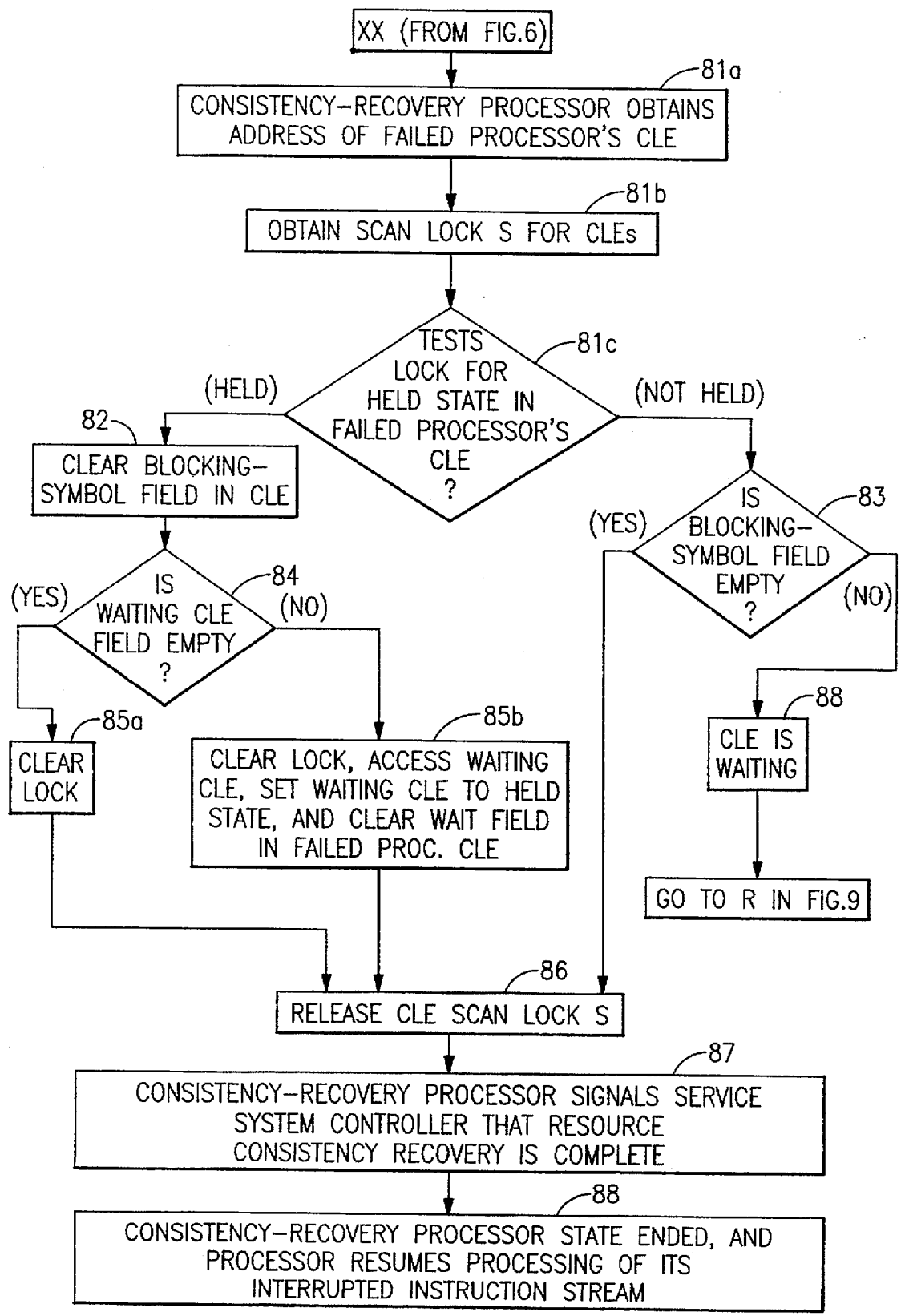
FIGS. 8 and 9 are flow diagrams of later parts of the recovery process initiatially performed in FIG. 6 when the failed processor was executing a PLO instruction using the CLE method of the PLO instruction execution disclosed in related specification Ser. No. 08/864,585.

FIG. 8 shows the process of recovering a CLE lockword in a system using processor-associated CLE locks to serialize accesses to resources using the same blocking symbols (BLS), as described in application Ser. No. 08/864,585. At step 81a, the resource-consistency-recovery processor determines the address of the failed processor's CLE. At step 81b, the processor contends for the CLE scan lock S until it is obtained so it will be the only processor then examining the CLE's. At step 81c, the CLE of the failed processor is tested for being in the held-state. If it is in held-state, control passes to step 82 where the BLS value (blocking symbol) in the CLE is cleared.

At step 84, the waiting-CLE field is tested in the CLE. If it is empty (i.e. set to zero state for indicating no processor is waiting for the lock held by the failed processor), the lock L is set to available state (i.e. not held) at step 85a. At step 86, the CLE scan lock S is released, and at step 87, the resource-consistency-recovery processor signals the service system controller that it has completed PLO recovery operations for the failed processor. At step 88, the resource-consistency-recovery processor assumes its normal role and resumes processing of its interrupted instruction stream.

If, at step 84, the waiting CLE field was not empty, then at step 85b, the lock L is set to available (i.e. not held state) in the failed processor's CLE, the waiting-CLE address is used to access the next CLE in the BLS chain containing the waiting CLE, and the lock L in that next CLE is set to held state, with the result that the failed processor's CLE lock is released and the next processor in its BLS chain is enabled to continue execution of its pending PLO instance. Control then passes to step 86 to release the scan lock S.

If, at step 81c, the failed processor's CLE indicated that it did not hold a lock, the BLS field is tested for empty to find if it was waiting for control of a BLS at step 83. If it is empty, control passes to step 86 to end the scan and release the CLE scan lock S. If it is not empty, indicating the CLE is waiting for control of the BLS lock at step 83, its waiting chain must be made consistent by the resource-consistency-recovery processor taking the failed processor's CLE out of its BLS chain. To do this, control passes to entry point R in FIG. 9 to continue the recovery.

Figure 9:
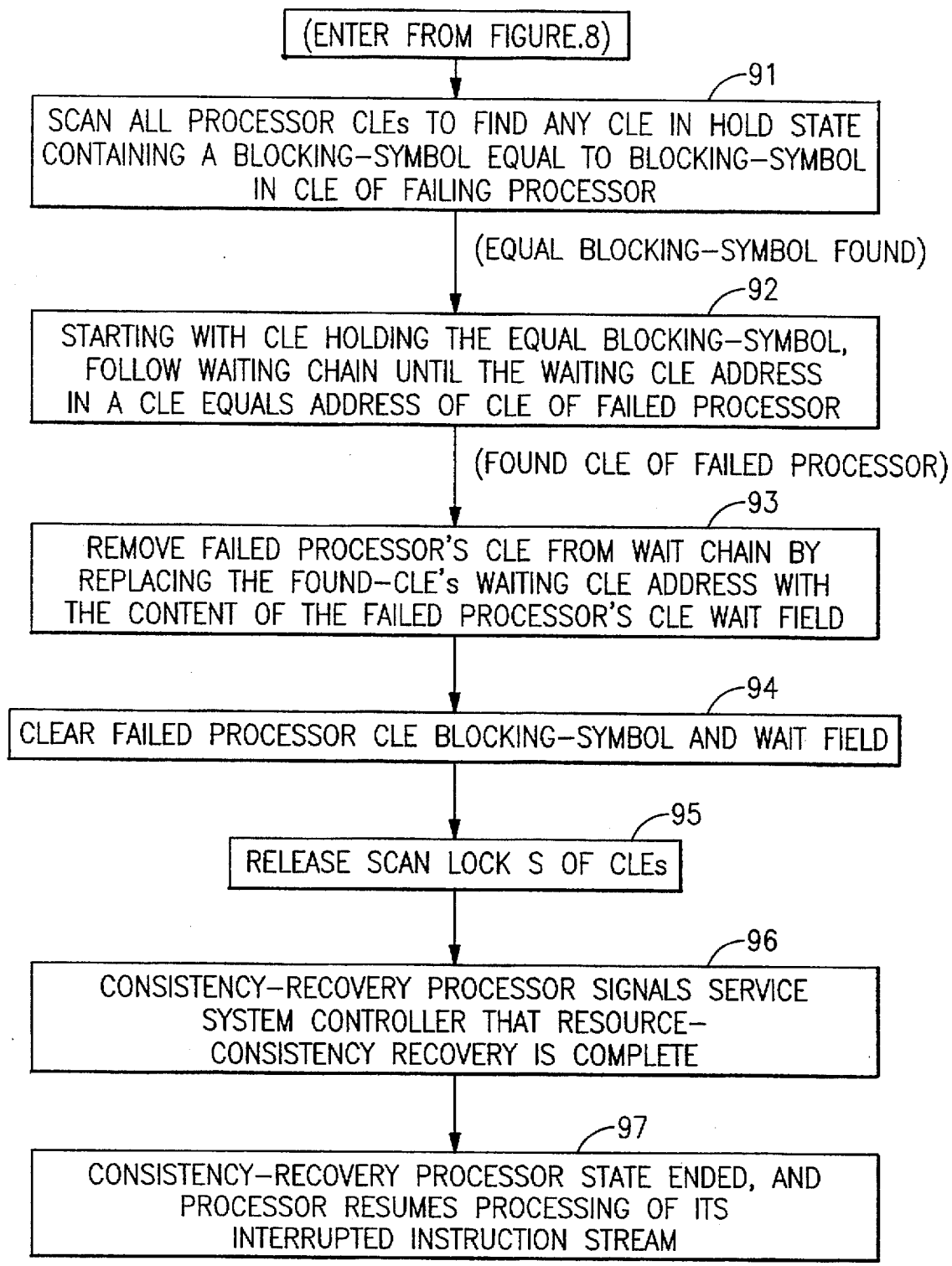

FIG. 9 shows the processing if the failed CLE was in the waiting CLE queue for a BLS. At step 91, all CLE's in the system are scanned to find the CLE that holds the BLS that was being waited for by the failed processor. Starting with that CLE, each CLE in the waiting CLE queue is examined in turn at step 92 by using the waiting CLE address in each CLE to address the next CLE, until the CLE of the failed processor is found in another CLE's waiting CLE field. At step 93, replace the content of the waiting CLE address in the CLE that was found at step 92 to be just before the failed processor in the waiting queue, with the address in the waiting-CLE address field in the CLE of the failed processor, thus removing the failed processor from the waiting-CLE queue, and mending the queue around its CLE. If the waiting CLE address in the failed processor's CLE was empty, it was last in the queue making its predecessor CLE become last in line for the BLS. If it is not empty, the CLE following that of the failed processor CLE becomes the successor of the failed processor's predecessor in the waiting chain (queue). At step 94 the BLS field and the waiting-CLE field in the failed processor's CLE are set to zero (empty). Control is transferred to step 95, which releases the CLE scan lock. At step 96, the resource-consistency-recovery processor signals the service system controller that it has completed PLO recovery operations for the failed processor. At step 97, the resource-consistency-recovery processor assumes its normal role and resumes processing of its interrupted instruction stream.

Figure 10:
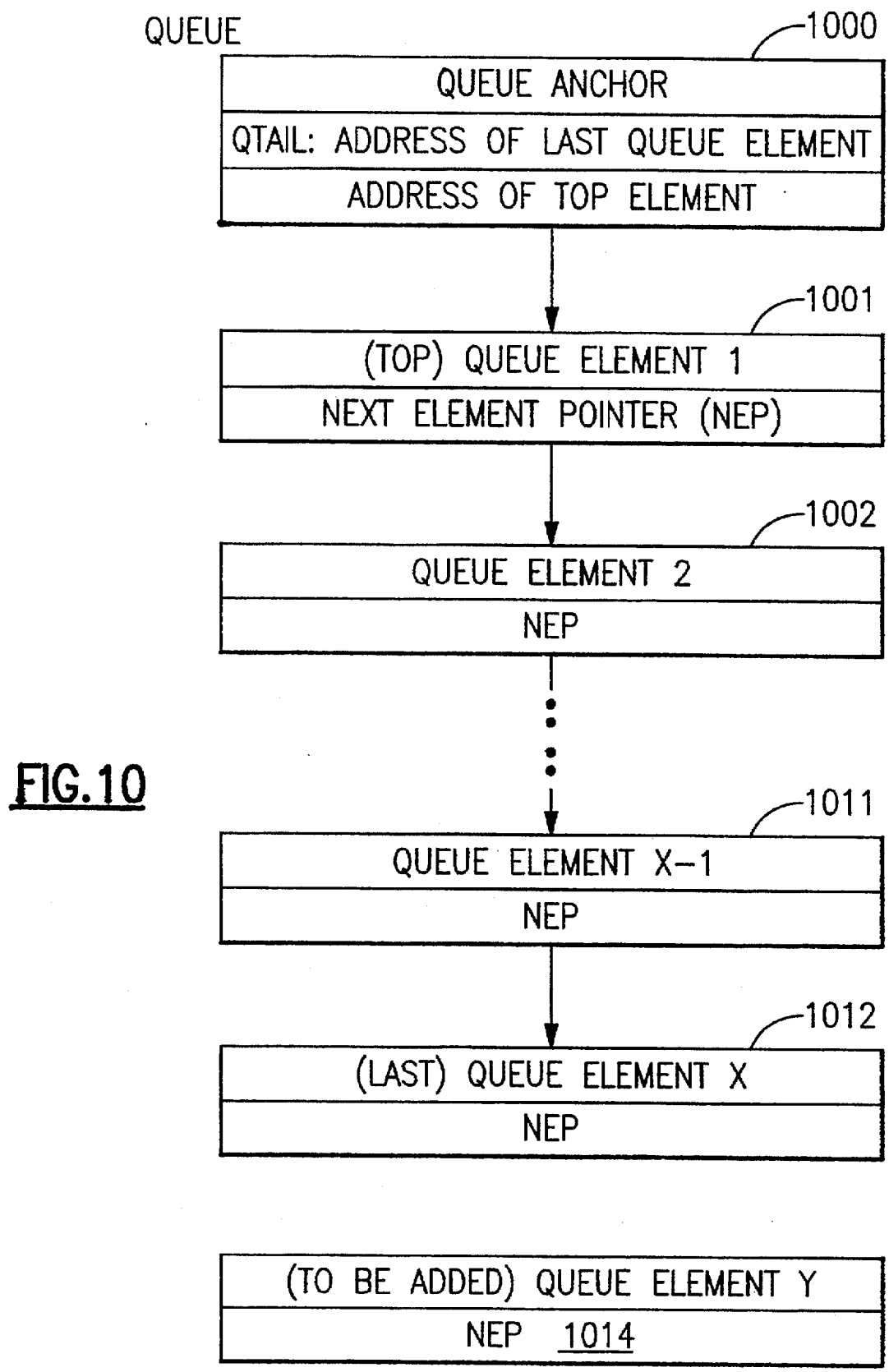
FIG. 10 is a queue (called QUEUE) representing a resource unit being changed by a processor executing a PLO instruction in an example of the operation of the flow process shown in FIGS. 5A and 5B.

Example of the PLO Instruction Execution Method in FIGS. 5A and 5B:

FIGS. 10, 11 and 12 are used in describing a simple example of an operation by the PLO execution process flowcharted in FIGS. 5A and 5B. This example executes a PLO instance using the PLO instruction shown in FIG. 11 for attempting to change a resource unit, which in this example is the queue shown in FIG. 10 which is located in the main storage (RAM) of a multiprocessor system. The PLO instruction used in this exemplary execution of a PLO instance uses general registers (GR1–GR7) shown in FIG. 12 which contain the PLO instruction operand values. GR1–GR7 are setup by instructions executing prior to the start of execution of the PLO instance, which is herein called the "subject PLO", which uses the contents of these GR1–GR7.

The PLO instruction format illustrated in the applications incorporated by reference utilize the same PLO operands located in storage and some of the operands are located indirectly in a parameter list addressed from an operand field in the PLO instruction. Thus many different formats are available for the same operands in a PLO instruction.

As stated above, each PLO instance for the same PLO instruction is subject to a new setup of operand values before execution of the PLO instance. During the interim time between operand setup and the execution of the PLO instance, an operand value set up earlier may have changed by the time execution starts for the PLO instance. This may happen if another PLO execution on a different processor of the system executes between the time some operands are set up on this processor and the time its PLO executes on its processor. It is therefore essential during execution of each PLO instance to verify at the time of execution, while the blocking symbol lock is held, that its previously-setup operand values are still valid. This is a part of PLO instruction execution. The program specifies, in its choice of PLO function code, which and how many comparisons should be made between data specified in the PLO instance, and the current value of fields in the resource, which fields are also specified in the parameters of the instance. These conditional tests, such as in steps 412, 531 and 551, are performed during the execution of each PLO instance to assure that the PLO instance will provide correct results by preventing an incorrect operand value from being used in the execution of a PLO instance.

FIG. 10 shows a queue, designated as QUEUE, which is the resource unit in the example described below. It has a queue anchor 1000, and the anchor is accessed in the execution of a PLO instance attempting to change the queue by adding a new element at the end of the queue, in this example. The example assumes the PLO instance is in a program executing on one of a plurality of central processors in a multiprocessor system, of which more than one of the processors may be simultaneously attempting to put a new element as the last element on the queue. After the addition of an element by any processor, the current last queue element X 1012 will become the second-to-last element; and then element X 1012 will contain a "next element pointer" (NEP) which addresses the new last queue element. When a next PLO instance adds another last element to the queue, it will chain it from the new last queue element, which then becomes the second-to-last element, and element X 1012 then becomes the third-to-last element in the queue. The PLO of the example is to add a new element Y 1014 to the end of the queue.

The processor program first executes a set of operand setup instructions to prepare the current values of operands for a PLO instruction instance. These setup instructions load the operand values into GR1 through GR7, shown in FIG. 12 as operand locations for the PLO instruction instance. These operand values include: the subject PLO instance's function code, FC, loaded into GR1, and the PLO blocking symbol (BLS) loaded into GR2 for the PLO instruction to be executed. GR3 is loaded with the address of the location in the queue anchor, herein called QTAIL, that contains the address of the currently last member of the queue. The address of QTAIL is known to each program setting up a PLO instance for accessing the queue. The program sets up GR4 with the QTAIL content, and it sets up GR5 with the address of element Y, which is the element to be added to the queue.

Each queue element contains an NEP (next element pointer) field at a predetermined location in the queue element. The NEP field contains the address chaining to the next element in the queue which logically follows the element in the queue. The chaining by the NEP field contents allows each queue element to be located anywhere storage space is available for the element. However, the current last element in the queue has its NEP field set to a predetermined value, such as zero, to indicate it is the currently last element of the queue. Thus, the NEP field in element Y 1014 is set to zero to indicate that it is to be the last element when it is chained into the queue. GR6 is loaded with the address of the NEP in element X 1012 (the last queue element at the time of setup). GR7 is loaded with the address of new element Y 1014 which is to be added to the end of the queue by execution of the PLO instance. If Y is successfully added to the queue by PLO, its address will replace the contents of QTAIL, and will be placed in the next-element address of the member it is replacing as the currently last member. That member, X in this example, will become the second-to-last member of the queue.

The content of GR4 is the comparand value used in each of comparison steps 412, 531 and 551 in FIGS. 4 and 5, which compares the setup value in GR4 with the current contents of QTAIL. If the GR4 value compares unequal with the current last element address in the queue anchor, then the "last queue element address" has been changed by another processor, due to its adding a new last element or deleting the last queue element, so that the now-current last queue element is not the last queue element which existed when the content of GR4 was setup. If element X is no longer the the last queue element, then the GR6 setup value (the address of NEP in the last queue element) is no longer valid since it is no longer the address of the NEP of the last queue element. It would be incorrect to use the address in GR6 to store the address of Y since that would incorrectly store Y into the NEP of X, which in this case would no longer indicate that it was last-in-queue, but would contain the address of the new currently last member, say Z, for example, as a result of a PLO execution on a different processor. Storing the address of Y into the X NEP field would have the effect of losing the currently last element Z since no other element would point to Z. The PLO comparison test prevents this from happening.

Thus, of the PLO operand setup values, only the contents of GR4 and GR6 are no longer valid if the last queue element was added or deleted by another processor's conflicting PLO instance during the interim between when GR1–GR7 were setup and when the execution of their PLO instance started. That is, during the short time span between the execution of the operand setup instructions loading GR1–GR7 and the initiation of execution of the PLO instance, another processor changed the "address of the last queue element" in the queue anchor by adding another last queue element or deleting the last queue element, so that the address of the NEP in the former last element X 1012 in GR6 is no longer the address of the NEP of the last queue element. The asynchronous nature of the execution of multiple processors of a multiprocessing system require that the PLO instruction executions be synchronized in this way for the programs using PLO. Programs using PLO may execute simultaneously on more than one processor of the system accessing the same, shared storage resources. The comparisons provided in PLO provide the necessary synchronization among multiple accesses to the same shared resource on different processors. On the other hand, the locking of the specified blocking symbol within PLO instruction execution provides serialization among the multiple processors for the changes made in the resource. In effect the locking allows multiple changes in the resource to be made as a single operation, as seen by other processors of the system. It is important to understand the distinction between these two facilities of the PLO instruction.

Therefore, it is only necessary to compare on the content of GR4 to determine if the queue has changed in a manner that would prevent the correct execution of the PLO instance dependent on the setup. Accordingly, only one comparand is used in this example for the steps 531 and 551 in FIGS. 5A and 5B.

This example assumes the queue is not empty, which means that the "address of the top of queue element" field in the queue anchor 1000 contains a non-zero value which addresses the first element of the queue, which may also be the last element on the queue.

When the execution of the PLO instance is started, step 531 in FIG. 5a is entered to test if the comparand in GR4 has changed. Thus, in this example, step 531 compares the contents of GR4 and the QTAIL content field in the queue anchor to determine if they are equal or not. Step 532 determines if they are equal, and if they are unequal it enters step 534 which sets an unsuccessful PLO condition code value for the PLO instance. If step 532 finds an equal condition, execution of the subject PLO instance continues by entering step 542 which forms the real addresses of all operands that will change the queue, and generates their operand values according to the FC of this PLO instance, at step 543. In this example that would be the real address of the QTAIL field in the queue anchor from GR3 with the value of the real address of new element Y 1014 in GR7, and the real address of the NEP field in element X 1012 from GR6 with the value of the real address of element Y in GR7. Where PLO is executed with virtual addresses, PLO generates the corresponding real addresses for saving in the Save Area.

Then step 557 is entered in FIG. 5B, and the processor obtains exclusive control of the resource unit (the queue) by obtaining the PLO lock for the blocking symbol, and setting the lock to the locked state, as has been previously explained herein. If the hashing method is being used in the execution of the subject PLO instance, FIG. 2 applies and the processor's PID is stored in association with the obtained lock. If the CLE method is being used in the execution of the subject PLO instance, FIG. 3 applies, and the processor's lock entry is used.

Step 551 again compares the contents of the GR4 to the contents of the queue anchor location "address of last queue element" for an equal/unequal condition. Then step 552 determines whether the equal or unequal condition was found. If an unequal condition was found, the subject PLO execution can not be allowed to continue and the program is to be notified that it was unsuccessful, so step 553 sets an unsuccessful condition code which is to be provided to the program to indicate PLO execution failure. Then step 548 is entered in which the lock is released (i.e., unlocked) for the subject PLO instance, and its execution is ended. The program will need to reissue the PLO instruction after it has at least reloaded GR4 and GR6 with new values from the queue.

The execution failure of the subject PLO is caused by another processor using a PLO instance to add or delete a last element on the queue during the interim after the program originally loaded GR4 and GR6 and before the PLO instruction obtained the lock, which will change the operand values required in GR4 and in GR6 for execution of the subject PLO. That is, the other processor executed another PLO instance which obtained the lock before the subject PLO and changed the last queue element. The program may setup GR1–GR7 for a next execution attempt by loading the current content of the anchor field "address of last queue element" into GR4 and setting the address of the NEP of the current last element into GR6, and not changing the contents of GR1–GR3, GR5 and GR7.

If the equal condition is found by step 552, then step 544 is entered, because the queue still has the same last element as when GR4 was setup. Now the lock is held on the resource, and this PLO instance may change it. Holding of the blocking symbol lock ensures that no other processor can change the resource at this point with its own PLO instruction, and cannot until the lock is released. Step 544 therefore sets the RI indicator to its inconsistent state in preparation for changing the queue by adding element Y 1014 as a new last element. The processor now performs all data store operations in the queue to chain element Y 1014 to element X 1012 in the queue. To do this, the executing PLO processor stores the address of element Y 1014 from GR7 into the "last element address" entry in the queue anchor, whose address is in GR4, and also the processor stores the address of element Y 1014 from the GR7 into the NEP location in element X 1012, which is addressed in GR6.

When all required changes have been made in the queue, step 546 is entered in which the processor sets the RI indicator of the processor's PLO area to its off state to indicate the queue is now in a data consistent state. The next step 547 is then entered to set the condition code to the "successful PLO" code value, and step 548 sets the hardware lock for the blocking symbol (used as the queue lock) to the unlocked state and provides the set condition code to the program issuing the executed PLO instance. This completes the execution of the PLO instance.

If the processor should fail during the window of resource change existing between steps 544 and 546, the RI indicator would be left in its on state to indicate the queue has been left in a data inconsistent state. This will be seen later by a resource-consistency-recovery processor (after failure of the original processor while executing the subject PLO).

However if the processor should fail during any of steps 546, 547, or 548, the resource has had all of its changes to be made performed by the PLO instance and is therefore in a data consistent state. But the hardware lock being used for the queue resource unit is still in its locked state, which will prevent other PLO instances from using the queue. That situation of a locked resource in a consistent state will be detected by a resource-consistency-recovery processor when it finds the RI indicator in an off state while the resource hardware lock is in the locked state. Then the resource-consistency-recovery processor will merely set off the resource hardware lock, possibly granting it to a waiting processor, if any, and the resource-consistency-recovery processor is done with its recovery operations. In FIG. 6, this would be discovered at step 64, and step 66 would start the blocking symbol lock processing, in case it has been left on by the failed processor.

While we have described our preferred embodiments of our invention, it will be understood that those skilled in the art, both now and in the future, may make various improvements and enhancements which fall within the scope of the claims, which follow. These claims should be construed to maintain the proper protection for the invention first disclosed herein.

What is claimed is:

1. A method of maintaining the integrity of data in a computer system against processor failure while executing perform locked operation (PLO) instructions, the data being stored in data resources accessible through storage of the computer system, each instance of execution of a PLO instruction (PLO instance) comprising the steps of:

structuring a save area in the storage for each processor in the computer system capable of executing PLO instructions, each PLO instance of execution having one or more operands specified by the PLO instruction of the PLO instance, the one or more operands including specifications for generating store operand values of data items to be stored in a resource unit specified by a blocking symbol in the PLO instance, associating a resource-inconsistency (RI) indicator with each processor's save area, the RI indicator being setable to at least a first state (RI state) and a second state (non-RI state), the non-RI state indicating resource data consistency in the resource unit, and the RI state indicating potential resource inconsistency in the resource unit specified by the PLO instance, and store operand values having been generated by using store operands specified in the PLO instance, initiating execution of the PLO instance by a processor while the RI indicator of the processor's save area is set to the non-RI state, and writing in the processor's save area each store operand value targeted for changing a data item in the resource unit while the RI indicator of the processor's save area is set to the non-RI state, and also writing in the processor's save area in association with each store operand value a resource address at which the store operand value is to be written in the resource unit.

2. A method of maintaining the integrity of data in a computer system against processor failure while executing perform locked operation (PLO) instructions as defined in claim 1, comprising the steps of:

setting the RI indicator to the RI state after the writing step and the also writing step have stored all of the store operand values and associated resource addresses in the processor's save area, copying each store operand value from the processor's save area to the associated resource address in the resource unit while the RI indicator is set to the RI state for changing the resource unit, and setting the RI indicator of the processor's save area to the non-RI state after the copying step has completed changing the resource unit by copying all of the store operand values from the processor's save area into the resource unit.

3. A method of maintaining the integrity of data in a computer system against processor failure while executing perform locked operation (PLO) instructions as defined in claim 1, comprising the steps of:

performing the writing and also writing steps in the processor's save area during the execution of the PLO instance before the processor attempts to obtain a lock on the resource unit specified by the PLO instance, and while the RI indicator of the processor's save area is set to the non-RI state.

4. A method of maintaining the integrity of data in a computer system against processor failure while executing perform locked operation (PLO) instructions as defined in claim 1, comprising the steps of:

performing the writing and also writing steps in the processor's save area during the execution of the PLO instance after the processor obtains a lock on the resource unit specified by the PLO instance, and while the RI indicator of the processor's save area is set to the non-RI state.

5. A method of maintaining the integrity of data in a computer system against processor failure while executing PLO instructions as defined in claim 1, comprising the step of:

storing with the processor's save area a function code (FC) obtained from the PLO instance of execution, and the storing step making the FC available in the processor's save area to a future recovery processor if the processor should fail while executing the PLO instance.

6. A method of maintaining the integrity of data in a computer system against processor failure while executing a perform locked operation (PLO) instruction, as defined in claim 2, further comprising the steps of:

performing the steps of writing in, and also writing in, the processor's save area without the processor having obtained a lock on the resource specified by the PLO instance, attempting by the processor to obtain a lock on the resource unit specified by the PLO instance while the RI indicator of the processor's save area is set to the non-RI state, and performing the setting and copying steps only if the lock on the resource is obtained by the processor.

7. A method of maintaining the integrity of data in a computer system against processor failure while executing a perform locked operation (PLO) instruction, as defined in claim 2, further comprising the steps of:

obtaining a lock on the resource unit specified by the PLO instance while the RI indicator of the processor's save area is set to the non-RI state, and then executing the steps of setting the RI indicator to RI state and copying each store operand value to the associated resources address in the resource unit.

8. A method of maintaining the integrity of data in a computer system against processor failure while executing PLO instructions as defined in claim 1, further comprising the steps of:

providing one or more comparand operands for the PLO instance, each comparand operand specifying a comparand location associated with the resource unit which contains a comparand value that is changed when the resource unit is changed, executing instructions, other than the PLO instruction of the PLO instance, prior to initiating execution of the PLO instance, for preparing operand values for the PLO instance including a prepared comparand value, during execution of the PLO instance, comparing the prepared comparand value with a current comparand value currently fetched from the comparand location of the resource unit, and continuing execution of the PLO instance only if the prepared comparand value is the same as the current comparand value.

9. A method of maintaining the integrity of data in a computer system against processor failure while executing PLO instructions as defined in claim 8, further comprising the steps of:

terminating execution of the PLO instance if the prepared comparand value is different from the current comparand value.

10. A method of maintaining the integrity of data in a computer system against processor failure while executing PLO instructions as defined in claim 8, further comprising:

performing the steps of structuring, associating, initiating, writing and also writing in response to the step of continuing execution, then obtaining a lock on the resource unit in response to the continuing execution step, setting the RI indicator to the RI state after the writing step and the also writing step have stored all of the store operand value and associated resource addresses in the processor's save area, copying each store operand value from the processor's save to the associated resource address in the resource unit while the RI indicator is set to the RI state for changing the resource unit, setting the RI indicator of the processor's save area to the non-RI state after the copying step has completed changing the resource unit by copying all of the store operand values from the processor's save area into the resource unit, and releasing the lock on the resource unit.

11. A method of maintaining the integrity of data in a computer system against processor failure while executing PLO instructions as defined in claim 1, further comprising the steps of:

providing one or more comparand operands for the PLO instance, each comparand operand specifying a comparand location associated with the resource unit which contains a comparand value that is changed when the resource unit is changed, executing instructions, other than the PLO instruction of the PLO instance, prior to initiating execution of the PLO instance, for preparing operand values for the PLO instance including a prepared comparand value, obtaining a lock on the resource unit upon initiating execution of the PLO instance, then comparing the prepared comparand value with a current comparand value currently fetched from the comparand location of the resource unit, and continuing execution of the PLO instance only if the prepared comparand value is the same as the current comparand value, performing steps of structuring, associating, initiating, writing and also writing to store the processor's save area in response to the step of continuing execution, next setting the RI indicator to the RI state after the writing step and the also writing step have stored all of the store operand values and associated resource addresses in the processor's save area, copying each store operand value from the processor's save area to the associated resource address in the resource unit while the RI indicator is set to the RI state for changing the resource unit, setting the RI indicator of the processor's save area to the non-RI state after the copying step has completed changing the resource unit by copying all the store operand values form the processor's save area into the resource unit to change the resource, and releasing the lock on the resource unit.

12. A method of maintaining integrity of data in a computer system by a processor in the computer system executing a program containing a perform locked operation (PLO) instruction specifying a function for changing data in a resource unit stored in a computer system, the PLO instruction having operands for specifying where and what in the resource unit is to be changed by execution of the PLO instruction, the processor performing the steps of:

executing by a processor preparatory instructions for determining values of operands of a PLO instance to be executed representing a PLO instruction specifying where and what in a resource unit is to be changed by execution of the PLO instance, including preparing operand addresses for locating in the resource insertions and/or deletions of data and for preparing operand values of data to be inserted and/or deleted in the resource unit at prepared operand addresses, operands of the PLO instance including one or more comparands, each comparand value prepared by fetching a predetermined location associated with the resource unit, each comparand value being changeable by another processor executing another PLO instance for changing the resource unit and, storing each prepared operand value, including each comparand value, for the operands of a PLO instance to be executed, initiating execution of the PLO instance by the processor, comparing each prepared comparand value with a current value of the comparand operand fetched from a predetermined location associated with the resource unit to test if the resource unit has been changed since the prepared comparand value was prepared, if the comparing step finds an equal condition, generating store operand values of the PLO instance for changing the resource unit and generating the addresses in the resource unit at which the store operand values are to be stored, and storing the store operand values and the addresses in a save area of the processor executing the PLO instance, setting to a locked state a hardware lock associated with a blocking symbol specified by the PLO instance for locking the resource unit from being changed by any other processor in the computer system, again comparing each prepared comparand value with a current value of the comparand operand fetched from a predetermined location associated with the resource unit to test if the resource unit has been changed since the prepared comparand value was prepared, if the again comparing step finds an equal condition, setting a resource-inconsistency (RI) indicator of the processor's PLO save area to a RI state in preparation for changing the resource unit, accessing the resource unit at locations specified by the addresses stored in the processor's save area to change the resource unit with the operand values stored in the processor's save area in accordance with a function code (FC) specified in the PLO instance being executed, resetting the RI indicator to a non-RI state after completion of changes of the resource unit, and resetting to an unlocked state the hardware lock associated with the blocking symbol specified in the PLO instance to enable the resource unit to be accessed by any processor in the computer system.

13. A method of maintaining the integrity of data in a computer system by executing a perform locked operation (PLO) instruction as defined in claim 12, further including the steps of:

terminating the execution of the PLO instance if either the comparing step, or the again comparing step, finds an unequal condition, and signaling an issuing program a termination of the execution of the PLO instance to enable the issuing program to again execute preparatory instructions for a reissue of the PLO instruction of the PLO instance.

14. A method of maintaining integrity of data in a computer system by a processor in the computer system executing a program containing a perform locked operation (PLO) instruction specifying a function for changing data in a resource unit stored in a computer system, the PLO instruction having operands for specifying where and what in the resource unit is to be changed by execution of the PLO instruction, the processor performing the steps of:

executing by a processor preparatory instructions for determining values of operands of a PLO instance to be executed representing a PLO instruction specifying where and what in a resource unit is to be changed by execution of the PLO instance, including preparing operand addresses for locating in the resource insertions and/or deletions of data and for preparing operand values of data to be inserted and/or deleted in the resource unit at prepared operand addresses, operands of the PLO instance including one or more comparands, each comparand value prepared by fetching a predetermined location associated with the resource unit, each comparand value being changeable by another processor executing another PLO instance for changing the resource unit and, storing each prepared operand value, including each comparand value, for the operands of a PLO instance to be executed, initiating execution of the PLO instance by the processor setting to a locked state a hardware lock associated with a blocking symbol specified by the PLO instance for locking the resource unit from being changed by any other processor in the computer system, comparing each prepared comparand value with a current value of the comparand operand fetched from a predetermined location associated with the resource unit to test if the resource unit has been changed since the prepared comparand value was prepared, if the comparing step finds an equal condition, generating store operand values of the PLO instance for changing the resource unit and generating the addresses in the resource unit at which the store operand values are to be stored, and storing the store operand values and the addresses in a save area of the processor executing the PLO instance, setting a resource-inconsistency (RI) indicator of the processor's PLO save area to a RI state in preparation for changing the resource unit, accessing the resource unit at locations specified by the addresses stored in the processor's save area to change the resource unit with the operand values stored in the processor's save area in accordance with a function code (FC) specified in the PLO instance being executed, resetting the RI indicator to a non-RI state after completion of changes of the resource unit, and resetting to an unlocked state the hardware lock associated with the blocking symbol specified in the PLO instance to enable the resource unit to be accessed by any processor in the computer system.

15. A method of maintaining the integrity of data in a computer system against processor failure while executing a PLO instance of a PLO instruction, each PLO instance specifying a blocking symbol associated with a resource unit, each processor in the computer system capable of executing PLO instances having a PLO save area, and during execution of each PLO instance the PLO save area storing PLO operand values, and addresses of the operand values, which change the resource unit associated with the blocking symbol in an executing PLO instance, the method comprising the steps of:

detecting by an operational processor a processor identifier (PID) with a fail signal communicated from a failed processor in the computer system executing a PLO instance of a PLO instruction, accepting by the operational processor of the communicated PID to temporarily become a recovery processor for preserving the consistency of the resource unit, accessing by the recovery processor a resource-inconsistency (RI) indicator associated with the failed processor's PLO save area, and detecting a setting of a RI indicator which may be set to an RI state to indicate the resource unit may be in an inconsistent state or to a non-RI state to indicate the resource unit is in a consistent state, the RI state existing only if the lock on the resource unit was in locked state when the processor failed, if the RI indicator is found by the recovery processor to be in the RI state, restoring the resource unit to the consistent state by the recovery processor utilizing the contents of the failed processor's PLO save area to change the resource unit in the same way as would have been done by the failed processor if it had not failed, locating by the recovery processor a hardware lock entry for the resource unit, and resetting the lock entry to the unlocked state, terminating the recovery operation, and the recovery processor returning to other operations.

16. A method of maintaining the integrity of data in a computer system against processor failure while executing instances of PLO instructions for changing resource units associated with blocking symbols specified in the PLO instructions, as defined in claim 15 in which the RI indicator of the failed processor's PLO save area indicates the RI state, further comprising:

the restoring step copying into the resource unit operand values (found stored in the failed processor's PLO save area) to associated resource addresses (also found stored in the PLO save area) as specified by a function code (FC) stored with the failed processor's PLO save area.

17. A method of maintaining the integrity of data in a computer system against processor failure while executing instances of PLO instructions for changing resource units associated with blocking symbols specified in the PLO instructions, as defined in claim 15 in which the RI indicator of the failed processor's PLO save area indicates the non-RI state, further comprising the steps of:

the restoring step not being performed, and the locking step resetting the hardware lock on the resource unit to unlocked state to allow the resource unit to be used in the consistent state by any processor in the computer system.

18. A method of maintaining the integrity of data in a computer system against processor failure while executing instances of PLO instructions for changing resource units associated with blocking symbols specified in the PLO instructions, as defined in claim 15, in which the lock must be found by the recovery processor before the lock can be set to the unlocked state, the lock finding process being dependent on whether the hardware locks in the computer system are in: blocking-symbol-hash-located entries (hash entries), or in processor-associated entries (CLE entries), the method for locating hash entries further comprising the steps of:

scanning the PLO lock entries in a predetermined order to locate any lock entry containing the PID of the failed processor, and if any lock entry is found to contain the PID of the failed lock entry, performing the steps of:
clearing the PID from the lock entry,
setting a lock field in the lock entry to an unlocked state, and
ending operations of the recovery processor for the failed processor's PLO instance, since the resource unit is now enabled for use by another PLO instance.

19. A method of maintaining the integrity of data in a computer system against processor failure while executing instances of PLO instructions for changing resource units associated with blocking symbols specified in the PLO instructions, as defined in claim 15, in which the lock must be found by the recovery processor before the lock can be set to the unlocked state, the lock finding process being dependent on whether the hardware locks in the computer system are in: blocking-symbol-hash-located entries (hash entries), or in processor-associated entries (CLE entries), the method for locating hash entries further comprising the steps of:

scanning the PLO lock entries in a predetermined order to locate any lock entry containing the PID of the failed processor, and if no lock entry is found to contain the PID of the failed lock entry, performing the step of:
ending operations of the recovery processor for the failed processor's PLO instance, since no lock entry was found for the failed processor.

20. A method of maintaining the integrity of data in a computer system against processor failure while executing instances of PLO instructions for changing resource units associated with blocking symbols specified in the PLO instructions, as defined in claim 15, in which the lock must be found by the recovery processor before the lock can be set to the unlocked state, the lock finding process being dependent on whether the hardware locks in the computer system are in: blocking-symbol-hash-located entries (hash entries), or in processor-associated entries (CLE entries), the method for locating CLE entries further comprising the steps of:

obtaining a scan lock on all CLE PLO lock entries to allow only one processor at a time to access the lock entries, accessing lock entry for the failed processor by using the PID of the failed processor, testing a lock in lock entry to find if the lock is set to the locked state, clearing a blocking symbol from the lock entry if found in the locked state by the test step, determining if a waiting field in the lock entry contains any waiting CLE address, setting the lock field to the unlocked state in the lock entry, releasing the scan lock when the wait field does not contain any waiting CLE address, and ending operations of the recovery processor for the failed processor's PLO instance to enable the processor to perform other tasks.

21. A method of maintaining the integrity of data in a computer system against processor failure while executing instances of PLO instructions for changing resource units associated with blocking symbols specified in the PLO instructions, as defined in claim 15, in which the lock must be found by the recovery processor before the lock can be set to the unlocked state, the lock finding process being dependent on whether the hardware locks in the computer system are in: blocking-symbol-hash-located entries (hash entries), or in processor-associated entries (CLE entries), the method for locating CLE entries further comprising the steps of:

obtaining a scan lock on all CLE PLO lock entries to allow only one processor at a time to access the lock entries, accessing lock entry for the failed processor by using the PID of the failed processor, testing a lock in lock entry to find if the lock is set to the locked state, accessing a blocking symbol field in the lock entry if the lock is set to unlocked state, releasing the scan lock if no blocking symbol is found in the lock entry, and ending operations of the recovery processor for the failed processor's PLO instance to enable the processor to perform other tasks.

22. A method of maintaining the integrity of data in a computer system against processor failure while executing instances of PLO instructions for changing resource units associated with blocking symbols specified in the PLO instructions, as defined in claim 15, in which the lock must be found by the recovery processor before the lock can be set to the unlocked state, the lock finding process being dependent on whether the hardware locks in the computer system are in: blocking-symbol-hash-located entries (hash entries), or in processor-associated entries (CLE entries), the method for locating CLE entries further comprising the steps of:

obtaining a scan lock on all CLE PLO lock entries to allow only one processor at a time to access the lock entries, accessing lock entry for the failed processor by using the PID of the failed processor, testing a lock in lock entry to find if the lock is set to the locked state, accessing a blocking symbol field in the lock entry if the lock is set to unlocked state, finding that the failed processor was in a wait chain of CLEs waiting for the resource unit if a blocking symbol is found in the lock entry in an unlocked state, removing the CLE of the failed process from the waiting chain for the resource, and ending operations of the recovery processor for the failed processor's PLO instance to enable the processor to perform other tasks.

23. A method of maintaining the integrity of data in a computer system against processor failure while executing instances of PLO instructions for changing resource units associated with blocking symbols specified in the PLO instructions, as defined in claim 22, in which the removing step further comprises the steps of:

scanning the CLEs in the locked state to find a CLE containing the blocking symbol specified in the CLE of the failed processor (failed CLE) in order to find the beginning CLE currently at the beginning of a waiting chain which must contain the failed CLE, tracing the CLEs in the waiting chain starting with the beginning CLE to find the failed CLE and to identify a predecessor CLE and any successor CLE of the failed CLE, removing the failed CLE from the waiting chain by changing the waiting field in the predecessor CLE to a CLE address of the successor CLE if a successor CLE exists in the waiting chain, or setting the waiting field in the predecessor CLE to indicate it is the last CLE in the waiting chain if no successor CLE is found by the tracing step, clearing the blocking symbol and clearing the waiting field from the failed CLE, releasing the scan lock, and ending operations of the recovery processor for the failed processor's PLO instance with the PLO lock entry set to a condition for enabling another PLO instance to request changing the resource.

24. A method of maintaining the integrity of data in a computer system against processor failure while executing instances of PLO instructions for changing resource units associated with blocking symbols specified in the PLO instructions, as defined in claim 23, in which the tracing step further comprises the steps of:

examining a waiting field in the beginning CLE to find a pointer to a next CLE, and then accessing any pointer in a waiting field in each next CLE in the waiting chain until the failed CLE is located, and identifying a predecessor CLE of the failed CLE and any successor CLE of the failed CLE while tracing the CLEs in the waiting chain, and no successor CLE existing if the failed CLE does not have any pointer in its waiting field.

25. A method of maintaining the integrity of data in a computer system against processor failure while executing instances of PLO instructions for changing resource units associated with blocking symbols specified in the PLO instructions, as defined in claim 24, in which the tracing step further comprises the steps of:

writing in the waiting field of the predecessor CLE a pointer to the successor CLE to remove the failed CLE from the waiting chain when the failed CLE is not the last CLE in the waiting chain.

26. A method of maintaining the integrity of data in a computer system against processor failure while executing instances of PLO instructions for changing resource units associated with blocking symbols specified in the PLO instructions, as defined in claim 24, in which the tracing step further comprises the steps of:

writing in the waiting field of the predecessor CLE a last CLE indication to remove the failed CLE from the queue if no successor CLE exists in the waiting chain, due to the failed CLE having been the last CLE in the waiting chain.

27. A method of maintaining integrity of data in a computer system when a processor in the computer system is executing a program containing a perform locked operation (PLO) instruction specifying a function for changing data in a resource unit stored in a computer system, the PLO instruction having operands for specifying where and what in the resource unit is to be changed by execution of the PLO instruction, the processor performing the steps of:

detecting an occurance of a failure by the processor while executing a PLO instance of a PLO instruction, signaling to a predesignated entity in the computer system a processor failing indication with associated information including the PID of the failing processor and an indication that the failing processor is executing a PLO instance, receiving by the predesignated entity the processor failing indication with the associated information, sending by the predesignated entity a recovery signal with the associated information to one or more operational processors in the computer system, and one of the operational processors accepting the recovery signal to temporarily become a resource-consistency-recovery (RCR) processor for recovering the consistency of a resource subjected to the PLO instance in execution by the failing processor, performing by the RCR processor the steps of setting the RI indicator to the RI state after the writing step and the also writing step have stored all of the store operand values and associated resource addresses in the processor's save area, copying each store operand value from the processor's save area to the associated resource address in the resource unit while the RI indicator is set to the RI state for changing the resource unit, setting the RI indicator of the processor's save area to the non-RI state after the copying step has completed changing the resource unit by copying all of the store operand values from the processor's save area into the resource unit for recovering the consistency of the resource and leaving the resource unit in an unlocked condition for the resource unit to be reliably used in an execution of a later PLO instance by any operational processor in the computer system, terminating operations as a RCR processor to enable the processor to return to other processing tasks which may be unrelated to RCR operations.

\* \* \* \* \*